United States Patent
Endo

(10) Patent No.: US 10,027,958 B2
(45) Date of Patent: Jul. 17, 2018

(54) CODING APPARATUS AND METHOD FOR ENCODING IMAGE DATA

(71) Applicant: CANON KABUSHIKI KAISHA, Tokyo (JP)

(72) Inventor: Hiroaki Endo, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/175,876

(22) Filed: Jun. 7, 2016

(65) Prior Publication Data

US 2016/0360196 A1 Dec. 8, 2016

(30) Foreign Application Priority Data

Jun. 8, 2015 (JP) .................................. 2015-116027

(51) Int. Cl.
```
G06K 9/46      (2006.01)
H04N 19/103    (2014.01)
H04N 19/136    (2014.01)
H04N 19/176    (2014.01)
H04N 19/124    (2014.01)
```
(52) U.S. Cl.
CPC ......... *H04N 19/103* (2014.11); *H04N 19/124* (2014.11); *H04N 19/136* (2014.11); *H04N 19/176* (2014.11)

(58) Field of Classification Search
CPC ...... H04N 19/176; H04N 19/60; H04N 19/13; H04N 19/103; H04N 19/157; H04N 2201/33357; G06T 1/20; G06T 9/005
See application file for complete search history.

(56) References Cited

U.S. PATENT DOCUMENTS

| | | | | |
|---|---|---|---|---|
| 5,778,339 A | * | 7/1998 | Sonohara | ............ G10L 19/0212 704/200.1 |
| 6,414,992 B1 | * | 7/2002 | Sriram | .................... H04N 19/56 375/240.02 |
| 7,444,031 B2 | * | 10/2008 | Fukuzawa | ................. G06T 5/10 382/232 |

FOREIGN PATENT DOCUMENTS

| | | |
|---|---|---|
| JP | 2010-004514 A | 1/2010 |
| WO | 2011/031692 A2 | 3/2011 |

OTHER PUBLICATIONS

The above document was cited in a British Search Report dated Nov. 30, 2016, that issued in the corresponding British Patent Application No. 1609994.7.

* cited by examiner

*Primary Examiner* — Eueng-Nan Yeh
(74) *Attorney, Agent, or Firm* — Cowan, Liebowitz & Latman, P.C.

(57) ABSTRACT

An image processing apparatus comprising an acquiring unit configured to acquire an encoding target block having a plurality of groups each including a predetermined number of pixels, a deciding unit configured to decide, for each group, a quantization parameter used to quantize image data of the group and an encoding scheme so that a code length of the encoding target block does not exceed a predetermined value corresponding to a target code amount of the encoding target block, and an encoding unit configured to generate encoded data by encoding image data of the encoding target block in accordance with the quantization parameters and the encoding schemes decided for the respective groups by the deciding unit.

13 Claims, 14 Drawing Sheets

FIG. 4A

| GROUP NUMBER | 0 | | | 1 | | | 2 | | | ... | 15 | | |
|---|---|---|---|---|---|---|---|---|---|---|---|---|---|
| PIXEL NUMBER | 0 | 1 | 2 | 3 | 4 | 5 | 6 | 7 | 8 | ... | 45 | 46 | 47 |
| IMAGE DATA | R0 | G0 | B0 | R1 | G1 | B1 | R2 | G2 | B2 | ... | R15 | G15 | B15 |

FIG. 4B

| GROUP NUMBER | 0 | | | | 1 | | | | 2 | | | | ... | 7 | | | |
|---|---|---|---|---|---|---|---|---|---|---|---|---|---|---|---|---|---|
| PIXEL NUMBER | 0 | 1 | 2 | 3 | 4 | 5 | 6 | 7 | 8 | 9 | 10 | 11 | ... | 28 | 29 | 30 | 31 |
| IMAGE DATA | Cb0 | Y0 | Cr0 | Y1 | Cb1 | Y2 | Cr1 | Y3 | Cb2 | Y4 | Cr2 | Y5 | ... | Cb7 | Y14 | Cr7 | Y15 |

FIG. 4C

| GROUP NUMBER | 0 | | | | 1 | | | | 2 | | | | ... | 7 | | | |
|---|---|---|---|---|---|---|---|---|---|---|---|---|---|---|---|---|---|
| PIXEL NUMBER | 0 | 1 | 2 | 3 | 4 | 5 | 6 | 7 | 8 | 9 | 10 | 11 | ... | 28 | 29 | 30 | 31 |
| IMAGE DATA | R0 | Gr0 | Gb0 | B0 | R1 | Gr1 | Gb1 | B1 | R2 | Gr2 | Gb2 | B2 | ... | R7 | Gr7 | Gb7 | B7 |

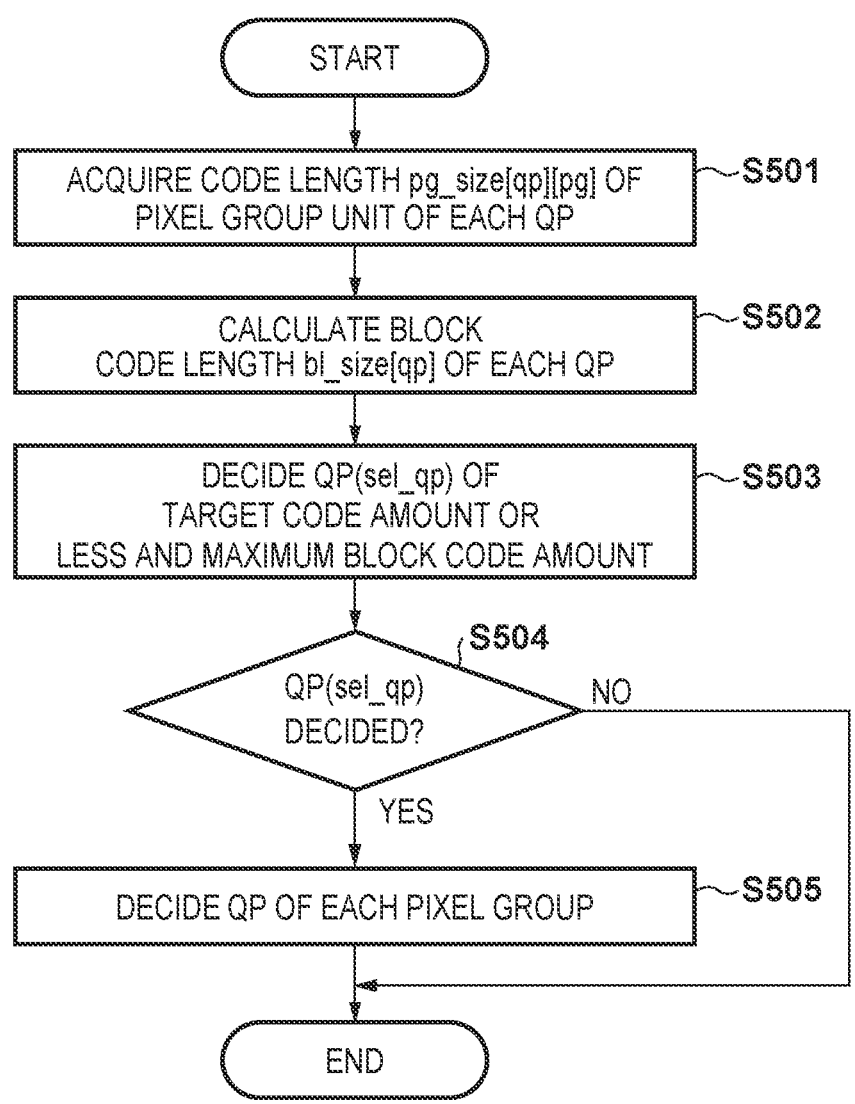

FIG. 9A

| QP | Pixel Group Number 0 | 1 | 2 | 3 | 4 | 5 | 6 | 7 | 8 | 9 | 10 | 11 | 12 | 13 | 14 | 15 | HEADER CODE LENGTH | BLOCK CODE LENGTH |
|---|---|---|---|---|---|---|---|---|---|---|---|---|---|---|---|---|---|---|
| 0 | 35 | 35 | 28 | 28 | 25 | 38 | 20 | 21 | 21 | 22 | 23 | 23 | 21 | 22 | 24 | 24 | 23 | 433 |
| 1 | 32 | 32 | 26 | 24 | 24 | 24 | 18 | 19 | 19 | 22 | 23 | 21 | 20 | 22 | 24 | 24 | 23 | 397 |
| 2 | 32 | 32 | 24 | 22 | 22 | 22 | 18 | 17 | 17 | 20 | 20 | 19 | 19 | 20 | 22 | 22 | 23 | 371 |
| 3 | 30 | 30 | 24 | 20 | 20 | 20 | 16 | 16 | 16 | 20 | 20 | 18 | 18 | 18 | 20 | 20 | 23 | 349 |

FIG. 9B

| QP | Pixel Group Number 0 | 1 | 2 | 3 | 4 | 5 | 6 | 7 | 8 | 9 | 10 | 11 | 12 | 13 | 14 | 15 | HEADER CODE LENGTH | BLOCK CODE LENGTH |
|---|---|---|---|---|---|---|---|---|---|---|---|---|---|---|---|---|---|---|
| 0 | 35 | 35 | 28 | 28 | 25 | 38 | 20 | 21 | 21 | 22 | 23 | 23 | 21 | 22 | 24 | 24 | 23 | 433 |
| 1 | 32 | 32 | 26 | 24 | 24 | 24 | 18 | 19 | 19 | 22 | 23 | 21 | 20 | 22 | 24 | 24 | 23 | 397 |
| 2 | 32 | 32 | 24 | 22 | 22 | 22 | 18 | 17 | 17 | 20 | 20 | 19 | 19 | 20 | 22 | 22 | 23 | 371 |
| 3 | 30 | 30 | 24 | 20 | 20 | 20 | 16 | 16 | 16 | 20 | 20 | 18 | 18 | 18 | 20 | 20 | 23 | 349 |

FIG. 9C

| QP | Pixel Group Number 0 | 1 | 2 | 3 | ... | 19 | 20 | 21 | 22 | 23 | 24 | 25 | 26 | ... | 44 | 45 | 46 | 47 | HEADER CODE LENGTH | BLOCK CODE LENGTH |
|---|---|---|---|---|---|---|---|---|---|---|---|---|---|---|---|---|---|---|---|---|
| 0 | 10 | 10 | 10 | 10 | ... | 10 | 10 | 10 | 10 | 10 | 10 | 10 | 10 | ... | 10 | 10 | 10 | 10 | 1 | 481 |
| 1 | 9 | 9 | 9 | 9 | ... | 9 | 9 | 9 | 9 | 9 | 9 | 9 | 9 | ... | 9 | 9 | 9 | 9 | 1 | 433 |
| 2 | 8 | 8 | 8 | 8 | ... | 8 | 8 | 8 | 8 | 8 | 8 | 8 | 8 | ... | 8 | 8 | 8 | 8 | 1 | 385 |
| 3 | 7 | 7 | 7 | 7 | ... | 7 | 7 | 7 | 7 | 7 | 7 | 7 | 7 | ... | 7 | 7 | 7 | 7 | 1 | 337 |

FIG. 12A
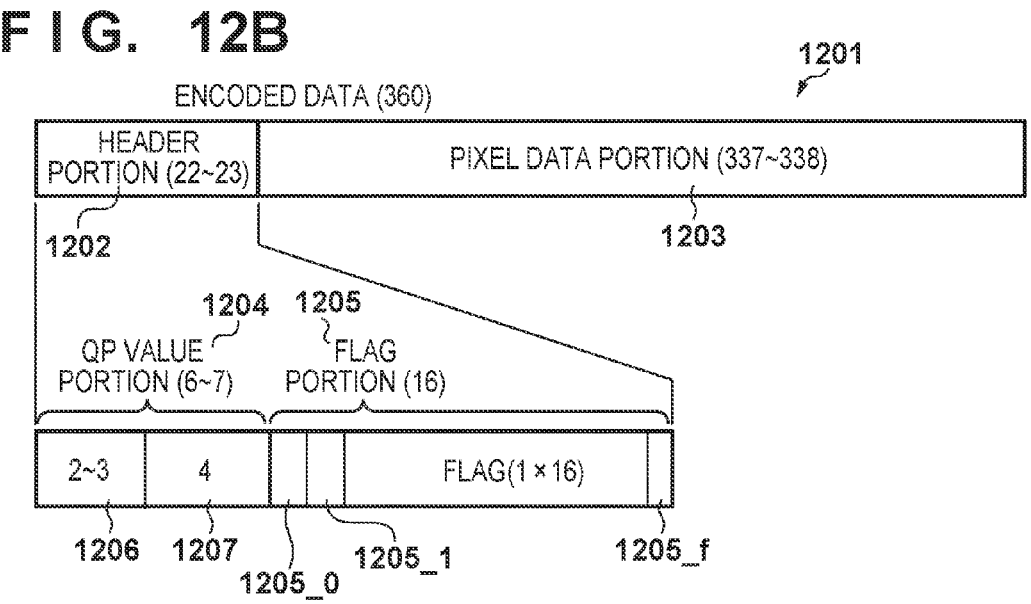
FIG. 12B
FIG. 12C
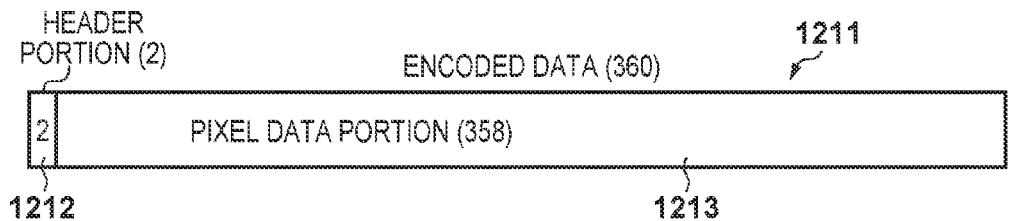

CODING APPARATUS AND METHOD FOR ENCODING IMAGE DATA

BACKGROUND OF THE INVENTION

Field of the Invention

The present invention relates to an image processing apparatus, and an image processing method.

Description of the Related Art

In recent years, in an image capturing apparatus that captures digital video or the like, with increases in resolution and frame rate, the amount of image data handled by the system has increased significantly, so there are demands to increase the speed of image memory and bus interface circuits. On the other hand, by performing image compression encoding before or after the image memory and bus interface circuits to reduce the amount of image data, it is possible to answer demands for increased circuit speed.

In this case, a small circuit scale and little encoding delay are desired in the encoding scheme for image compression. Therefore, a conventional DCT-based encoding scheme, represented by JPEG or MPEG2 encoding, is unsuitable. Consequently, there have been proposals employing a DPCM (Differential Pulse Code Modulation)-based predictive encoding scheme (see Japanese Patent Laid-Open No. 2010-004514).

In a DPCM-based predictive encoding scheme, image quality degradation occurs easily in an edge portion where there is a large variation in pixel levels. In the proposed method of Japanese Patent Laid-Open No. 2010-004514, encoding with little image quality degradation is possible if a difference value in adjacent pixel data is a predetermined threshold value or less. However, when the difference value in adjacent pixel data exceeds the predetermined threshold value as in the case of a steep edge portion, it is necessary to halve the original pixel data bits by quantization (for example, converting from 10 bits to 5 bits), and this causes a large amount of image quality degradation. Likewise, a large amount of image quality degradation is caused when there is a large difference between a predicted image and an image subject to encoding.

SUMMARY OF THE INVENTION

By realizing efficient encoding, image quality degradation in a portion where there is a large difference between pixels, such as a steep edge portion, is reduced.

One aspect of embodiments of the invention relates to an image processing apparatus comprising, an acquiring unit configured to acquire an encoding target block having a plurality of groups each including a predetermined number of pixels, a deciding unit configured to decide, for each group, a quantization parameter used to quantize image data of the group and an encoding scheme so that a code length of the encoding target block does not exceed a predetermined value corresponding to a target code amount of the encoding target block, wherein the deciding means selects, as the encoding scheme of respective groups, either of a first encoding scheme that outputs quantized image data and a second encoding scheme that outputs encoded data of a differential between quantized image data and prediction data, and an encoding unit configured to generate encoded data by encoding image data of the encoding target block in accordance with the quantization parameters and the encoding schemes decided for the respective groups by the deciding unit, wherein the deciding unit is further configured to assign, as the quantization parameter of the respective groups, either a first quantization parameter or a second quantization parameter corresponding to a quantization step smaller than a quantization step corresponding to the first quantization parameter, out of the plurality of quantization parameters, and wherein the deciding means selects as an encoding mode for the encoding target block either a first mode that selects whichever of the first encoding scheme and the second encoding scheme can obtain a smaller code length as the encoding scheme of the group, or a second mode that selects the first encoding scheme as the encoding scheme of all groups of the encoding target block, and decides the quantization parameters and the encoding schemes of the plurality of groups of the encoding target block in accordance with the selected encoding mode.

Further features of the present invention will become apparent from the following description of exemplary embodiments (with reference to the attached drawings).

BRIEF DESCRIPTION OF THE DRAWINGS

FIGS. 4A to 4C illustrate a relationship between pixel data and pixel groups composing an encoding block.

FIG. 5 is a flowchart showing an example of processing in a QP deciding unit corresponding to an embodiment of the invention.

FIGS. 9A to 9C show an example of code lengths and selected QP values in pixel group units corresponding to an embodiment of the invention.

FIGS. 12A to 12C show an example of an encoded data format corresponding to a second embodiment of the invention.

DESCRIPTION OF THE EMBODIMENTS

First Embodiment

Figure 1A:
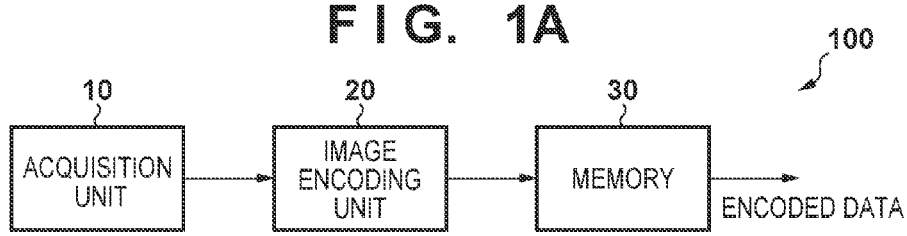
FIG. 1A is a block diagram showing an exemplary configuration of an image processing apparatus corresponding to an embodiment of the invention.

Below, an image processing apparatus corresponding to an embodiment of the invention will be described. FIG. 1A shows an exemplary configuration of an image processing apparatus in an embodiment of the invention. An image processing apparatus 100 has, for example, an acquisition unit 10, an image encoding unit 20, and a memory 30. In the image processing apparatus 100 in FIG. 1A, each block, other than a physical device such as an image sensor or a display element, may be configured in hardware using a dedicated device, logic circuit, or memory. Alternatively, each such block may be configured in software by a computer such as a CPU executing a processing program stored in a memory. The image processing apparatus 100 can be embodied as a digital camera, for example. Otherwise, the image processing apparatus 100 can be embodied as, for example, an arbitrary information processing terminal or image capturing apparatus such as a personal computer, a portable telephone, a smartphone, a PDA, a tablet terminal, or a digital video camera.

In FIG. 1A, the acquisition unit 10 has a function to input image data. The acquisition unit 10, for example, includes a configuration to input image data through an image capturing unit having an image sensor or from outside through a transmission path. Alternatively, the acquisition unit 10 includes a configuration to read out image data from a storage medium or the like. Also, the acquired image data may be still image data, or may be moving image data. In a case where the image data that the acquisition unit 10 acquires is moving image data, a plurality of frames of moving image data may be successively acquired.

The acquisition unit 10 supplies acquired image data to the image encoding unit 20. The image encoding unit 20 encodes image data supplied from the acquisition unit 10 according to an encoding scheme of any of pulse code modulation (PCM) or differential pulse code modulation (DPCM), and outputs encoded data having a compressed amount of information. Encoded data that has been output is stored in the memory 30. The memory 30 has a storage capacity necessary in order to store the encoded data that has been output from the image encoding unit 20. In a processing unit of a later stage, development processing and further compression processing are performed on the encoded data that has been stored in the memory 30.

Note that in FIG. 1A, the acquisition unit 10, the image encoding unit 20, and the memory 30 are shown as having independent configurations, but when performing packaging in the image processing apparatus 100, these components may, for example, be integrated as a single body in one chip, or alternatively may be configured independently as separate bodies.

Description of Image Encoding Unit

Figure 1B:
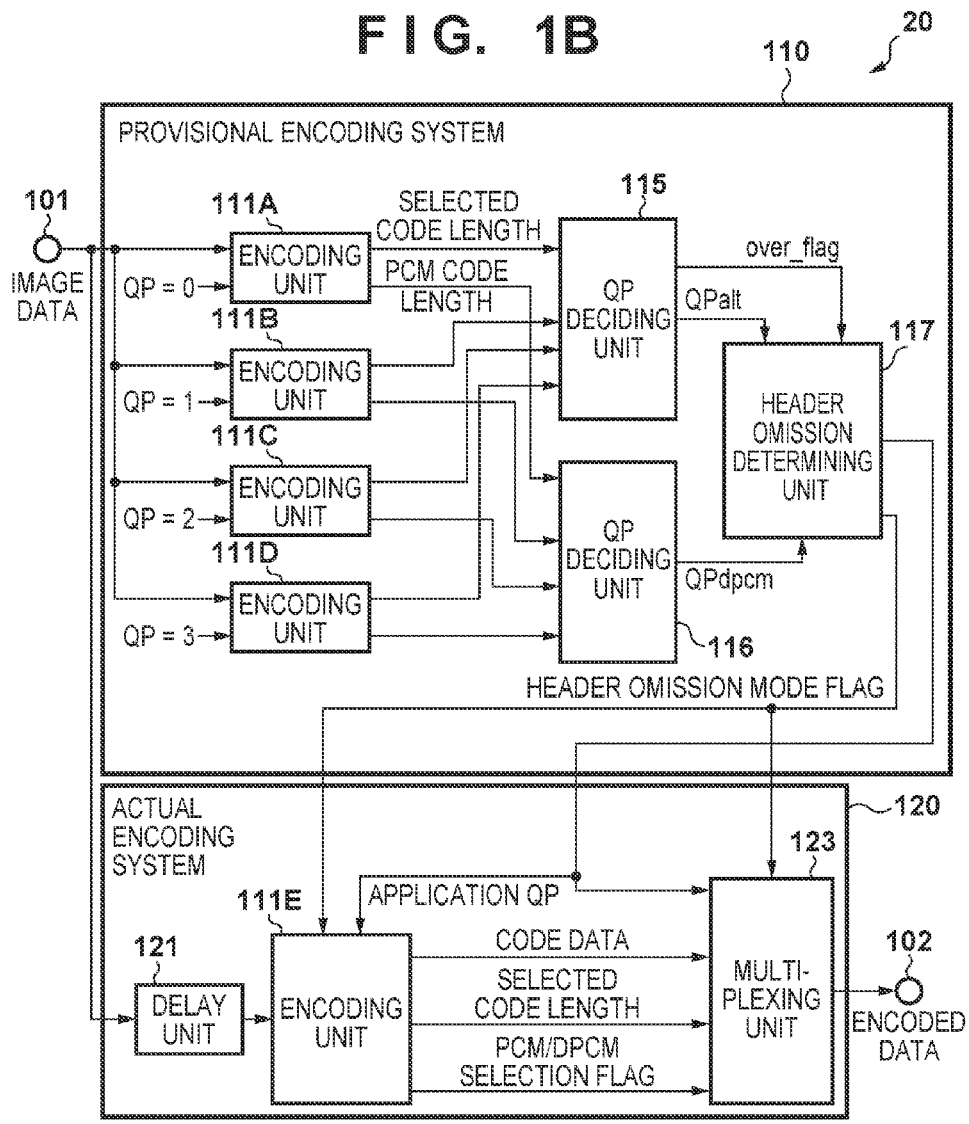
FIG. 1B is a block diagram showing an exemplary configuration of an image encoding unit corresponding to an embodiment of the invention.

Below, the configuration and operation of the image encoding unit 20 corresponding to an embodiment of the invention will be described with reference to FIG. 1B. FIG. 1B is a block diagram showing an exemplary configuration of the image encoding unit 20 according to an embodiment of the invention. The image encoding unit 20 is configured from two large blocks, i.e. a provisional encoding system 110 and an actual encoding system 120. Further, the provisional encoding system 110 is configured from encoding units 111A to 111D, QP deciding units 115 and 116, and a header omission determining unit 117.

The provisional encoding system 110 operates to decide a set of quantization parameters and a header omission mode flag used when performing actual encoding in the actual encoding system 120. In encoding processing performed by the actual encoding system 120, the header omission mode flag is used in order to switch between a later-described first encoding mode in which PCM/DPCM can be mixed and a second encoding mode fixed to PCM. The actual encoding system 120 is configured with a delay unit 121, an encoding unit 111E, and a multiplexing unit 123, and executes actual encoding including quantization processing using the set of quantization parameters that were decided by the provisional encoding system 110. Also, the actual encoding system 120 multiplexes encoding results, generates encoded data according to the value of the header omission mode flag, and outputs to outside the encoded data that was generated.

The image encoding unit 20 may be configured as an image encoding apparatus as a single body in hardware using a dedicated device, logic circuit, or memory, or alternatively, the image encoding unit 20 may be configured in a distributed manner with a plurality of devices or the like. Alternatively, the image encoding unit 20 may be configured in software by a computer such as a CPU executing a processing program stored in a memory.

Code Blocks and Pixel Groups

In the present embodiment, in the image encoding processing executed by the image encoding unit 20, input image data is divided into blocks (referred to below as 'encoding blocks') having a predetermined size (number of pixels), and encoding is performed in encoding block units. Also, an encoding block is further divided into 'pixel groups' composed of a predetermined number of one or more pixels. A pixel group is a unit for performing later-described encoding scheme (PCM/DPCM) switching or quantization parameter (referred to below as 'QP') switching. A pixel group is desirably composed of highly-correlated pixels, such as pixels having the same coordinates or adjacent pixels, and may be composed only of elements having the same color, or may be composed of elements having a plurality of colors.

In the present embodiment, an encoding block has 48 pixels (16 horizontal pixels of each color element of RGB image data×one vertical pixel×three colors). Also, a total of three pixels including one pixel of each color element serves as a pixel group.

FIG. 4A illustrates the relationship between pixel data and pixel groups constituting an encoding block in the present embodiment. As shown in FIG. 4A, the encoding block is composed of 16 pixels of each color element R, G, and B. Also, a group number is assigned to each color element group composed of R, G, and B according to pixel position, and some pixel number from 0 to 47 is assigned to each pixel. For example, R0, G0, and B0, which are data items of the first pixel of each color element, compose a pixel group having a group number of '0', and R1, G1, and B1, which are data items of the second pixel, compose a pixel group having a group number of '1'. In the present embodiment, data of each pixel is referred to as 'image data'.

Description of Encoding Unit 111

Figure 3:
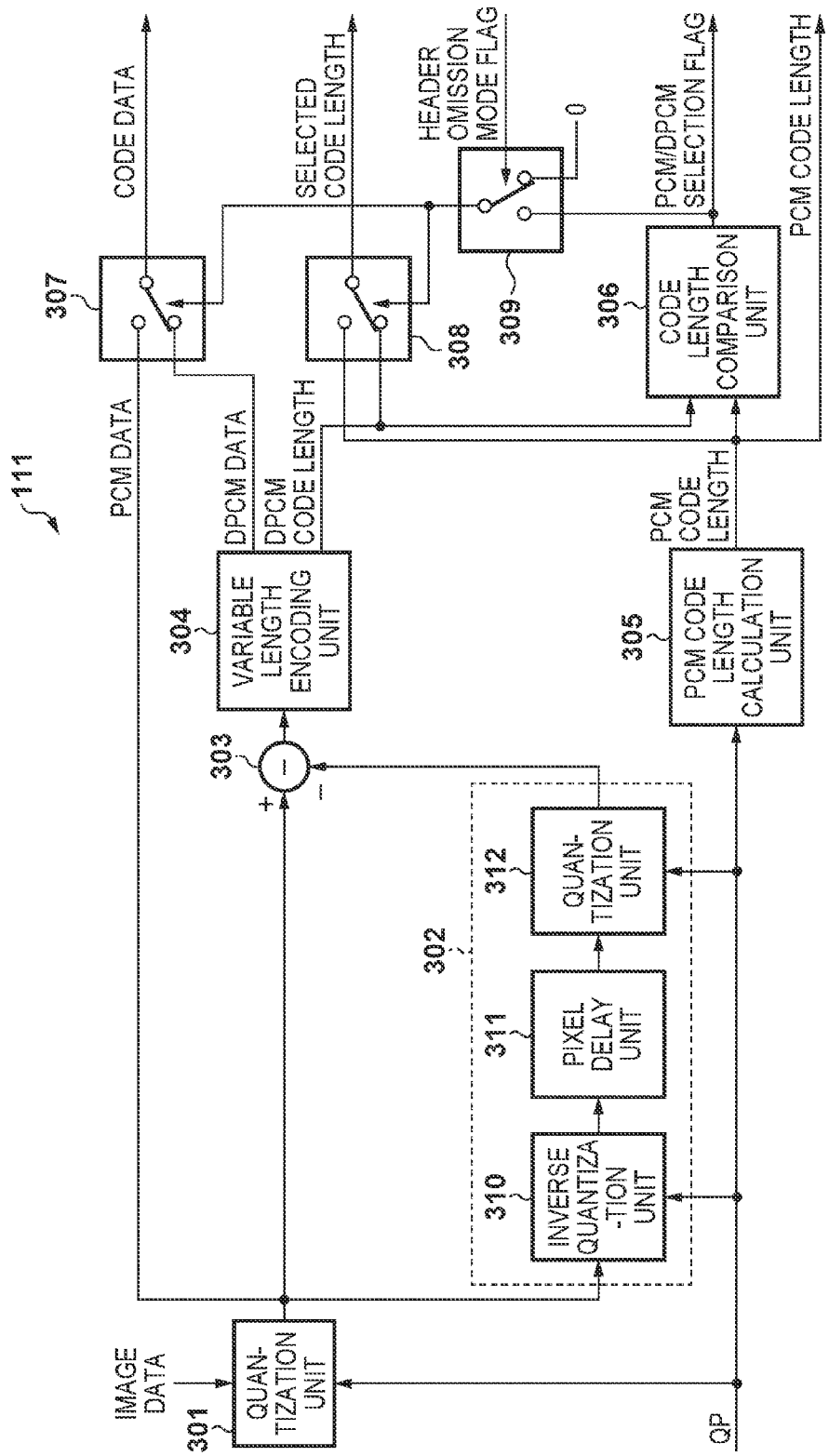
FIG. 3 is a block diagram showing an exemplary configuration of an image encoding unit corresponding to an embodiment of the invention.

Next is a description of the configuration and operation of the encoding unit 111 used in both the provisional encoding system 110 and the actual encoding system 120, with reference to FIG. 3. FIG. 3 is a block diagram showing an exemplary configuration of the encoding unit 111. As shown in FIG. 3, the encoding unit 111, for example, is configured including a quantization unit 301, a prediction unit 302, a subtractor 303, a variable length encoding unit 304, a PCM code length calculation unit 305, a code length comparison unit 306, and selectors 307, 308, and 309.

Image data and QP values can be input to the encoding unit 111. In the case of the provisional encoding system 110, QP values may be assigned in advance as fixed values to each of the encoding units 111A to 111D. FIG. 1B shows one example where QP values of 0, 1, 2, and 3 are respectively assigned in order to the encoding units 111A to 111D. In the case of the provisional encoding system 110, each encoding unit may also hold QP values in advance. A QP value that was decided by the provisional encoding system 110 can be input to the actual encoding system 120 from the header omission determining unit 117. Below, the specific configuration and operation of the encoding unit 111 will be described in detail.

First, image data that was input to the encoding unit 111 is input to the quantization unit 301. The quantization unit 301 quantizes the input image data using the provided QP value, and outputs the quantized data to each of the prediction unit 302, the subtractor 303, and the selector 307. In the present invention, quantized data that has been quantized by the quantization unit 301 is referred to as PCM data. In the description of the present embodiment, the QP value is an integer value having a minimum value of 0, and can be changed in a range from 0 to 3, but a configuration may also be adopted in which a larger QP value is set and even larger quantization steps are used.

In the present embodiment, the quantization unit 301 uses smaller (finer) quantization steps as the QP value becomes smaller, and uses larger (coarser) quantization steps as the QP value becomes larger. Also, quantization is performed such that a significant bit of the PCM data decreases by one bit when the QP value increases by one. For example, quantization expressed by Expression 1 is performed.

$$\text{Quant}=\text{Data}/(1<<\text{QP}) \quad \text{(Exp. 1)}$$

(Quant: quantized data, Data: input image data, QP: quantization parameter)

Also, $1<<\text{QP}$ indicates that image data that was input is bit-shifted by the number of bits indicated by QP.

Due to performing quantization as indicated by Expression 1, the output QP value and the significant bit become as follows.

QP=0: quantization step=1, input data is output as-is without quantization. Significant bit unchanged.

QP=1: quantization step=2, input data is quantized to ½. Significant bit decreases by one bit.

QP=2: quantization step=4, input data is quantized to ¼. Significant bit decreases by two bits.

QP=n: quantization step=$(1<<n)$, input data is quantized to $1/(1<<n)$. Significant bit decreases by n bits.

Above Expression 1 is given as an example of quantization processing in the present embodiment, but is not a limitation of the present invention. Any quantization can be performed such that the code length decreases by one bit each time the QP value changes by one. For example, non-linear quantization may also be performed. In the present embodiment, increasing the QP value one-by-one from QP=0 to QP=n is referred to as raising the quantization step by one step, or increasing the quantization step by one step, or setting a coarser quantization step by one step, or the like. Also, conversely, decreasing the QP value one-by-one from QP=n to QP=0 is referred to as lowering the quantization step by one step, or decreasing the quantization step by one step, or setting a finer quantization step by one step, or the like.

The PCM code length calculation unit 305 decides the code length of the PCM data that was output from the quantization unit 301 from the number of bits of image data (10 bits in the present embodiment) and the QP value, using below Expression 2.

$$\text{PCM code length}=\text{number of image data bits}-\text{QP} \quad \text{(Exp. 2)}$$

In the present embodiment, the code length of PCM data decreases by one bit each time the QP value increases by one. Therefore, with QP=0 as the initial value, the code length of PCM data shortens by one bit each time the QP value increases by one, beginning from 10 bits. Here, in the provisional encoding system 110, the QP value is assigned in a fixed manner for each of the encoding units 111A to 111D, so the PCM code length is also a fixed value. Therefore, a configuration may also be adopted in which the PCM code length calculation unit 305 does not calculate the PCM code length from the operation in Expression 2, but rather, holds a fixed value of the PCM code length based on the assigned QP value, and outputs that fixed value. The PCM code length calculation unit 305 outputs the decided PCM code length to each of the code length comparison unit 306 and the selector 308, and also outputs the decided PCM code length to outside of the encoding unit 111.

Next is a description of operation of the prediction unit 302. As shown in FIG. 3, the prediction unit 302 is configured including a inverse-quantization unit 310, a pixel delay unit 311, and a quantization unit 312. The PCM data that was input to the prediction unit 302 is temporarily inverse-quantized in the inverse-quantization unit 310, and then input to the pixel delay unit 311. The QP value that was used in image data quantization by the quantization unit 301 is used as-is in inverse-quantization processing in the inverse-quantization unit 310. The pixel delay unit 311 delays color element portions such that prior values of the same color element become prediction data.

For example, in the present embodiment, as shown in FIG. 4A, the image data of each color element of RGB is input in order, and after encoding the item of image data G0, the items of image data B0 and R1 are encoded prior to encoding G1. Therefore, with a three pixel delay, the pixel delay unit 311 outputs to the quantization unit 312 inverse-quantized image data that was being held at the time when item G1 is encoded. The quantization unit 312 quantizes the image data that was input from the pixel delay unit 311. At this time, the QP value used when the quantization unit 301 quantizes the item of image data G1 is input to the quantization unit 312, so the quantization step is the same between the quantization unit 301 and the quantization unit 312. The configuration whereby quantization is performed again after inverse-quantization was performed in the prediction unit 302 is a necessary configuration for causing quantization steps to be the same in a case where QP values differ between pixels, so this configuration is essential in the actual encoding system 120. On the other hand, in the provisional encoding system 110, the QP value is fixed, so a configuration may be adopted in which the inverse-quantization unit 310 and the quantization unit 312 are omitted and there is only the pixel delay unit 311. The results of quantization by the quantization unit 312 are output to the subtractor 303 as prediction data. Note that for the initial pixel (R0, G0, B0) of each color element in the encoding block, a value of 0 is output as prediction data because a prior pixel does not exist.

The subtractor 303 outputs a differential between the PCM data from the quantization unit 301 and the prediction data from the prediction unit 302 as predicted differential data to the variable length encoding unit 304. The predicted differential data is data that has a positive or negative value, and has a value near 0 in a flat portion where there is little variation in the image data, and has a large value in an edge portion or the like where there is a large variation in the image data. The predicted differential data ordinarily has the characteristics of a Laplace distribution with 0 at the center.

The variable length encoding unit 304 performs encoding on the predicted differential data that was input, using a predetermined variable length encoding scheme, and outputs code data and a code length for each single pixel. The code data is output to the selector 307, and the code length is output to each of the code length comparison unit 306, the selector 308, and outside of the encoding unit 111. The predetermined variable length encoding scheme includes, for example, Huffman code, Golomb code, or the like. In the variable length encoding scheme executed by the variable length encoding unit 304, code data having a shortest code length is assigned in a case where the input value is 0, and the code length of the code data increases as the absolute value of the input value increases. Note that in the present embodiment, the code data output from the variable length encoding unit 304 is referred to as DPCM data, and the corresponding code length is referred to as a DPCM code length.

The code length comparison unit 306 compares the PCM code length and the DPCM code length by the above-described pixel group units, and generates a PCM/DPCM selection flag for selecting the code data having the shorter code length. The code length comparison unit 306 is configured to hold a PCM code length and a DPCM code length for each of the colors R, G, and B that compose a pixel group. The PCM/DPCM selection flag is output to the selector 309, and is used for switching of output data in each selector according to the header omission mode flag. The PCM/DPCM selection flag is also output to outside of the encoding unit 111.

Code Length Comparison Flow

Figure 7:
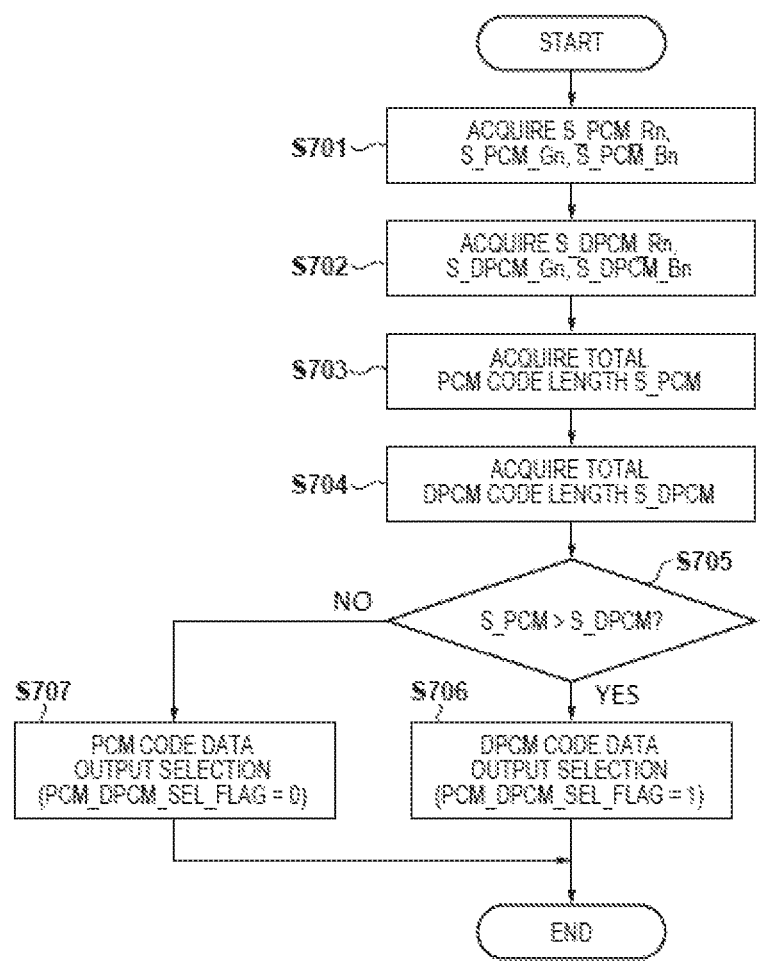
FIG. 7 is a flowchart showing an example of processing in a code length comparison unit corresponding to an embodiment of the invention.

Here, details of the code length comparison in the code length comparison unit 306 will be described with reference to the flowchart in FIG. 7. The code length comparison is performed by the above-described pixel group units.

The code length comparison unit 306, in Step S701, acquires a PCM code length for each of the color components below from the PCM code length calculation unit 305, and then, in Step S702, acquires a DPCM code length for each of the color components below from the variable length encoding unit 304.

S_PCM_Rn: PCM code length of Rn
S_PCM_Gn: PCM code length of Gn
S_PCM_Bn: PCM code length of Bn
S_DPCM_Rn: DPCM code length of Rn
S_DPCM_Gn: DPCM code length of Gn
S_DPCM_Bn: DPCM code length of Bn Here, an example is shown in which input of data in RGB component format in FIG. 4A was executed on pixels of a group number n. In the present embodiment, each code length is acquired by the above-described steps, but as long as DPCM and PCM code lengths can be acquired for all pixels within a pixel group, the order in which the code lengths are acquired is not particularly limited.

Next, in Step S703, the code length comparison unit 306 acquires a PCM code length total value (S_PCM) by adding the code lengths acquired in Step S701. Likewise, in Step S704, the code length comparison unit 306 acquires a DPCM code length total value (S_DPCM) by adding the code lengths acquired in Step S702. Next, in Step S705, the code length comparison unit 306 compares S_PCM to S_DPCM to determine their relative size. When the DPCM code length of the pixel group is smaller (YES in Step S705), processing moves to Step S706, where PCM/DPCM selection flag information (PCM_DPCM_SEL_FLAG=1) that selects the DPCM code data is output. On the other hand, when the PCM code length is smaller (NO in Step S705), processing moves to Step S707, where PCM/DPCM selection flag information (PCM_DPCM_SEL_FLAG=0) that selects the PCM code data is output.

Returning to the description of FIG. 3, the selector 309 switches between the PCM/DPCM selection flag input from the code length comparison unit 306 and a fixed value that was provided in advance according to a header omission mode flag input from outside of the encoding unit 111, and outputs the result to the selectors 307 and 308. When the value of the header omission mode flag is 1, the fixed value is selected in the selector 309. On the other hand, when the value of the header omission mode flag is 0, the PCM/DPCM selection flag is selected, and notification of that flag information is given as-is to the selectors 307 and 308. In the present embodiment, the fixed value is 0, and the value of the PCM/DPCM selection flag is fixed to 0 (fixed to PCM mode (PCM_DPCM_SEL_FLAG=0)). Therefore, the selectors 307 and 308 select the PCM data and the PCM data code length.

The PCM data and the DPCM data are input to the selector 307, code data is selected according to the PCM/DPCM selection flag from the selector 309, and this code data is output to outside of the encoding unit 111. Specifically, when the flag value of the PCM/DPCM selection flag is 1, the DPCM data is selected, and when the flag value is 0, the PCM data is selected. The PCM code length and the DPCM code length are input to the selector 308, a code length is selected according to the PCM/DPCM selection flag, and this code length is output to outside of the encoding unit 111. The code length output from the selector 308 is particularly referred to as a 'selected code length' in the present embodiment. Specifically, the DPCM code length is selected when the flag value of the PCM/DPCM selection flag is 1, and the PCM code length is selected when the flag value is 0.

Description of Provisional Encoding System

Here, returning to the description of the image encoding unit 20 in FIG. 1B, provisional encoding processing in the provisional encoding system 110 will be described. Encoding is performed with the QP values of 0 to 3 by the plurality of encoding units 111A to 111D respectively on the image data that was input to the provisional encoding system 110 in FIG. 1B, a selected code length is output to the QP deciding unit 115, and the PCM code length is output to the QP deciding unit 116. Here, the selected code length expresses a code length of code data acquired by each encoding unit performing PCM encoding or DPCM encoding on the quantization results acquired by performing quantization processing in the quantization step corresponding to each QP value, and this selected code length is output from the selector 308. The PCM code length expresses a code length of quantization results acquired by each encoding unit performing quantization processing in the quantization step corresponding to each QP value, and this PCM code length is output from the PCM code length calculation unit 305. The encoding units 111A to 111D have the configuration shown in FIG. 3, and the code data, the selected code length, the PCM code length, and the PCM/DPCM selection flag exist as output signals. However, in the provisional encoding system 110, as described later, the QP deciding units 115 and 116 have the selected code length and the PCM code length, but do not have the code data and the PCM/DPCM selection flag. Therefore, a configuration may be adopted in which the encoding units 111A to 111D in the provisional encoding system 110 do not each output the code data and the PCM/DPCM selection flag.

In the present embodiment, the range of QP values used for encoding is 0 to 3, so the provisional encoding system 110 is provided with four of the encoding units iii. However, embodiments of the invention are not limited to this configuration, and the number of encoding units 111 can be changed according to the number of QP values used for encoding. Also, in the provisional encoding system 110, the header omission mode flag, which is an input signal to the encoding units 111A to 111D, is fixed to a value of 0, and a PCM/DPCM selection flag based on judgment results of the above-described code length comparison unit 306 is always used.

Operation of QP Deciding Units

In the provisional encoding system 110, the QP deciding units 115 and 116, based on information of the plurality of code lengths for each QP value that were input from the encoding units 111A to 111D in a prior stage, respectively decide a QPalt and a QPpcm that serve as candidates for an application QP value to be applied to a pixel group unit in the actual encoding system 120. Here, the selected code length, which is an input signal to the QP deciding unit 115, is a code length having a smaller value among the PCM code length and the DPCM code length that were acquired in each encoding unit 111. One code length, which is an input signal to the QP deciding unit 116, is the PCM code length in each encoding unit 111. The QP deciding unit 116 only has a different input signal, and has the same specific configuration and processing content as the QP deciding unit 115. Below, the operation of each QP deciding unit will be described.

Operation of QP Deciding Unit 115

An overview of the processing procedure executed by the QP deciding unit 115 in the present embodiment will be described with reference to FIG. 5. In FIG. 5, when main processing is started in each encoding block, in Step S501, the QP deciding unit 115 obtains for a pixel group unit, from the encoding units 111A to 111D, information of the code length that was calculated for each QP value assigned to each encoding unit. Below, the code length of code data to be obtained is expressed as pg_size[qp] [pg] with QP value: qp and pixel group number: pg as elements. Values of 0 to 3 are used for qp, and values of 0 to 15 are used for pg.

Next, in Step S502, the QP deciding unit 115 calculates a code length of the entire encoding block for each QP value. When calculating a code length of the entire encoding block, it is necessary to consider the code length of header information to be multiplexed on the encoded data. The header information is information of the QP values and the PCM/DPCM selection flag of each pixel group, necessary when decoding, and here the code length of the header information is 23 bits. The data structure of the header information will be described later with reference to FIG. 10B.

A block code length bl_size[qp], obtained by adding a header information code length hd_size (=23 bits) and a total of the code lengths of all pixel groups, is calculated. FIG. 9A shows a specific example of the values of pg_size[qp] [pg] and bl_size[qp]. In FIG. 9A, for example, a value (35) indicated by reference numeral 901 is a pg_size[0] [0], and indicates the code length when the head pixel group in the encoding block was encoded with QP=0. Likewise, a value (24) indicated by reference numeral 902 is a pg_size[0] [15], and indicates the code length when the last pixel group in the encoding block was encoded with QP=0. Also, a value (433) indicated by reference numeral 903 is a bl_size[0], and indicates the block code length when encoding was performed with QP=0, and a value (349) indicated by reference numeral 904 is a bl_size[3], and indicates the block code length when encoding was performed with QP=3. These respective values are expressed as bit units. In the following description as well, values in this drawing are given as examples of specific values.

Next, in Step S503, the QP deciding unit 115 selects as a sel_size, from among bl_size[qp], a block code length that is a predetermined target code amount target_size or less and has a maximum value, and at this time a qp is selected for a sel_qp. The specific processing in Step S503 is as shown in the flowchart in FIG. 6.

First, in Step S601, a flag over_flag for discriminating that even with a maximum QP (MAX_QP) the block code length has exceeded the target code amount target_size is initialized to 1. Here, a case where the flag over_flag is 1 indicates that even with the maximum QP (MAX_QP) the block code length has exceeded the target code amount target_size. Next, in Step S602, the QP deciding unit 115 initializes the QP value: qp to 0. Next, in Step S603, the QP deciding unit 115 compares the code length: bl_size[qp] of the encoding block for the presently selected QP to the target code amount: target_size. When the result of this comparison is that the bl_size[qp] is the target_size or less ('YES' in Step S603), processing moves to Step S604, and when the bl_size[qp] is greater than the target_size ('NO' in Step S603), processing moves to Step S607.

In Step S604, the bl_size[qp] that was the subject of the determination in Step S603 is set to the block code length sel_size to be selected. Next, in Step S605, the QP value of the bl_size[qp] is set to the sel_qp, which indicates a provisional QP of the encoding block. Afterward, in Step S606, the over_flag is updated to 0, in Step S609, the value of the over_flag is output to the header omission determining unit 117, and then processing is ended.

In Step S607, it is determined whether or not the value of the presently selected QP is less than the maximum value (MAX_QP), and if less than the maximum value, ('YES' in Step S607), in Step S608 the value of QP is updated to 1, and after returning to Step S603, processing is continued. If the present QP value is the maximum value or more ('NO' in Step S607), in Step S609, the value of the over_flag is output to the header omission determining unit 117, and then processing is ended. In the present embodiment, the value of MAX_QP is 3. When determined NO in Step S607, a block code length of a predetermined value corresponding to the target code amount or less does not exist, so the QP value cannot be selected. However, in this case, the value of the over_flag continues to be 1, so the header omission mode is selected.

In this way the QP value is updated one-by-one from the initial value of 0, and while raising the quantization step by one step at a time from 1 to 2 and from 2 to 4, encoding block code lengths are compared in order to the target code amount. Also, initially, a QP value corresponding to a block code length that is the target code amount or less can be set as a provisional QP value. Also, in a case where even with the maximum QP (MAX_QP) the block code length is not a predetermined value corresponding to the target code amount or less, that fact can be indicated by a value of 1 for the flag over_flag.

In the description of the present embodiment, the specific value of the target code amount target_size is 360 bits, for example. The amount of image data information prior to encoding is 10 bits×3×16=480 bits, so this value corresponds to ¾ of that amount of information. The size of the target code amount can be set arbitrarily according to an expected compression ratio. In the example shown in FIG. 9A, 349 (bits), which is the block code length bl_size[3] for QP: 3, is smaller than the target code amount 360 bits, and is selected as the sel_size. Also, the QP value of 3 in this case is set to the sel_qp. Here, in a case where the code length of the header information is not included in the code length of the encoding block, the value of the target code amount is obtained by subtracting the code length of the header information from 360 bits. In the above-described example, the header code length is 23 bits, so the target code amount in this case is 337 bits.

Figure 6:
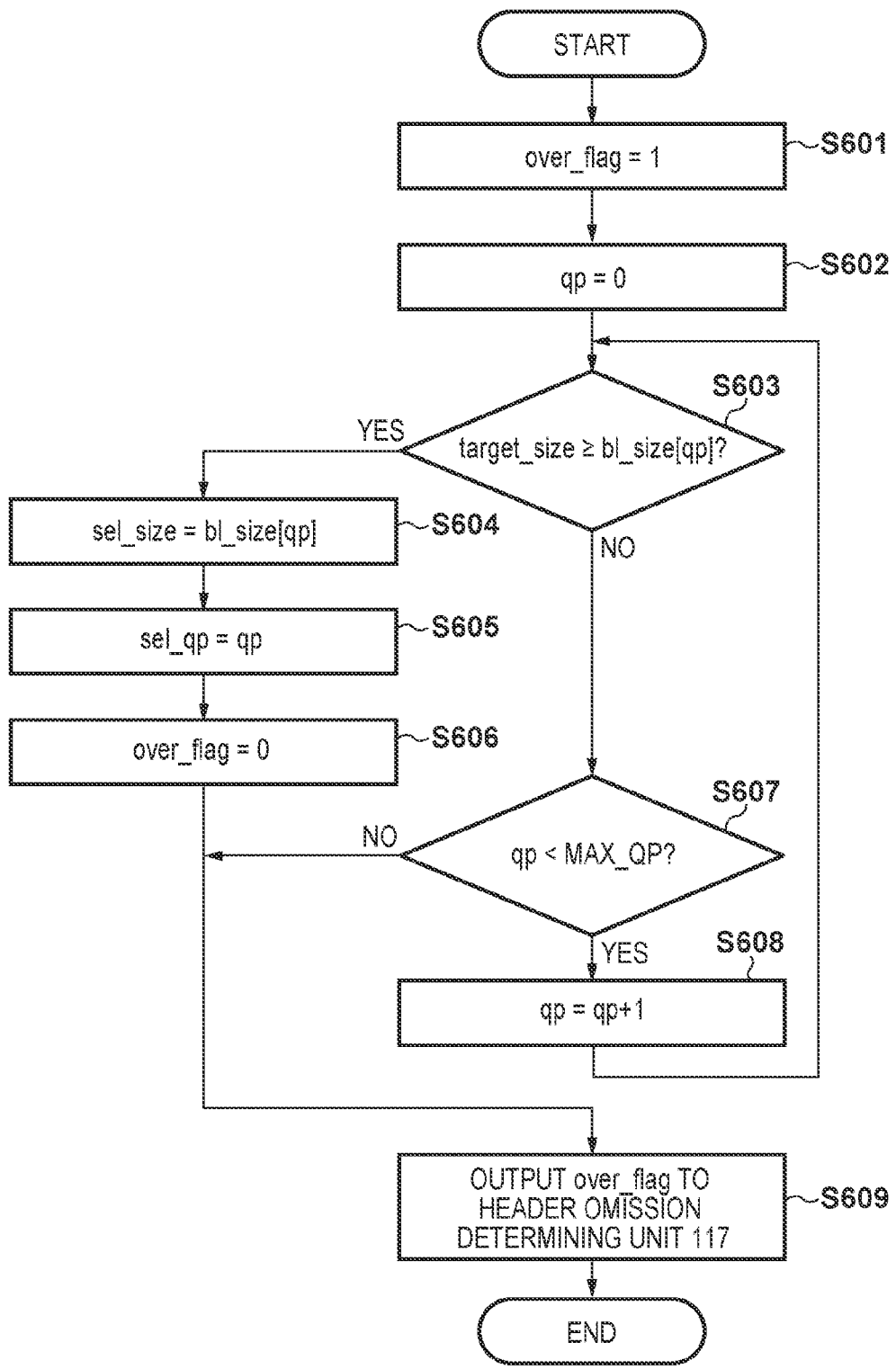
FIG. 6 is a flowchart showing an example of processing in Step S503 in FIG. 5.

Returning to the description of FIG. 5, in Step S504, it is determined whether or not the QP (sel_qp) that is the provisional QP value has been decided in the processing of FIG. 6. As described above, when a block code length that is the target code amount or less does not exist ('NO' in Step S504), the QP (sel_qp) has not been decided, and the value of the over_flag is set to 1, so processing ends there. When the QP (sel_qp) has been decided ('YES' in Step S504), in Step S505 the QP deciding unit 115 performs pixel group unit adjustment for the provisional QP value sel_qp of the encoding block decided in Step S503. In this way, the QPalt: pg_qp[pg] of the pixel group unit can be decided. The details of processing to decide the pg_qp[pg] in Step S505 will be described in detail with reference to the flowchart in FIG. 8.

Figure 8:
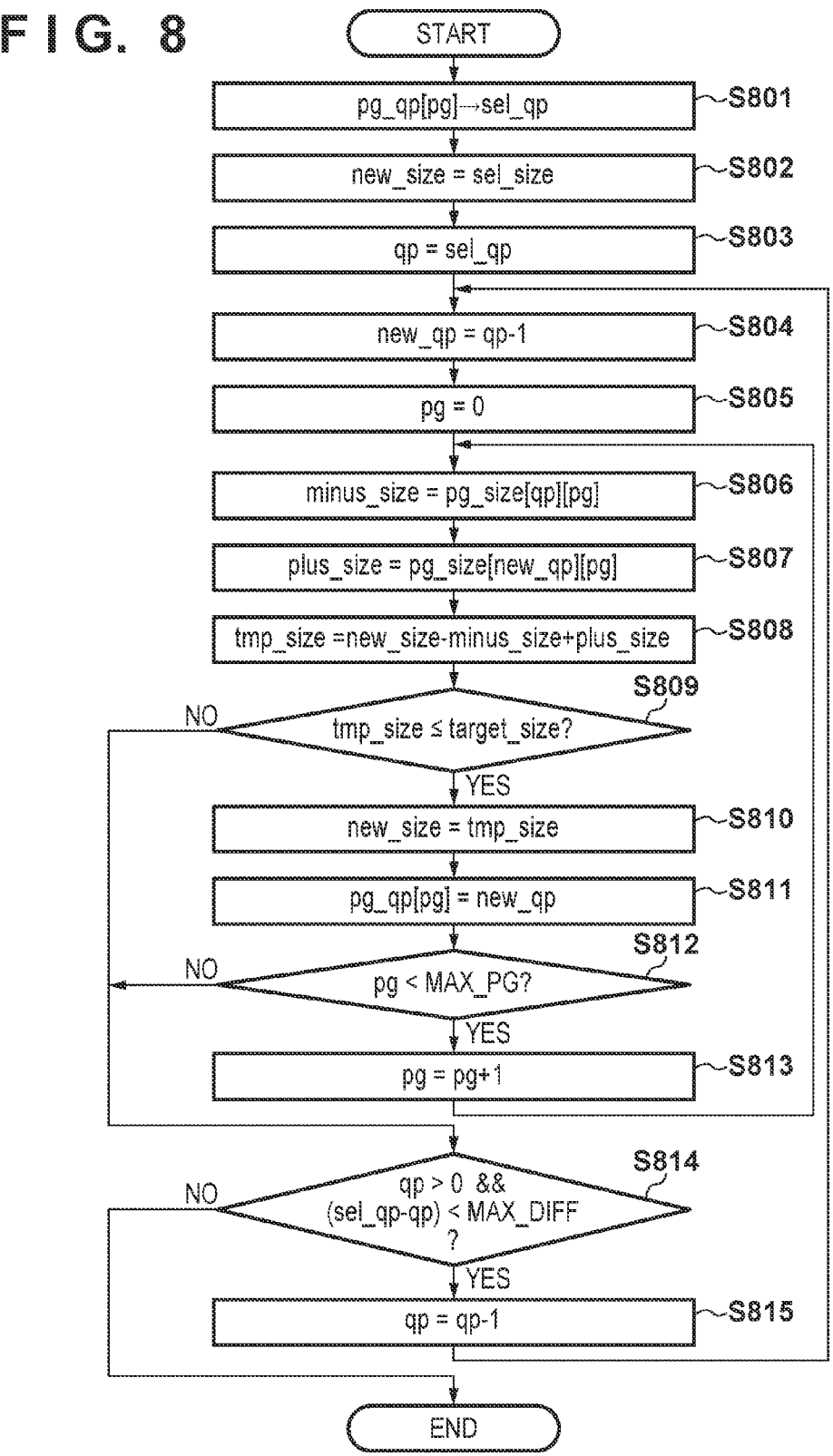
FIG. 8 is a flowchart showing an example of processing in Step S504 in FIG. 5.

In FIG. 8, in Step S801, the QP deciding unit 115 initializes the pg_qp[pg], which is the QPalt of the pixel group unit, with the QP: sel_qp that was decided in Step S503. At this time, all of the pg_qp[0] to the pg_qp[15] are initialized to the value of the sel_qp. In the example shown in FIG. 9A, QP=3 was selected so all of the pg_qp[0] to the pg_qp[15] are initialized to a value of 3. Next, in Step S802, the QP deciding unit 115 initializes the value of a parameter new_size, which indicates the code length of the encoding block at the present point in time, to the value of the sel_size that was decided in Step S603. For example, in the example shown in FIG. 9A, the sel_size was decided as the block code length 349 for a QP value of 3, so in Step S802, the value of the new_size is initialized to 349. In a case where the header code length is not considered, the block code length is 326. Next, in Step S803, the QP deciding unit 115 initializes the value of the parameter qp that indicates the presently selected QP with the value of the sel_qp that was decided in Step S604. For example, in the example shown in FIG. 9A, the sel_qp was set to 3, so in Step S803 the qp value is initialized to a value of 3.

Next, in Step S804, the QP deciding unit 115 initializes the value of a parameter new_qp, which indicates the new QP value, with a value obtained by subtracting 1 from the qp. The new_qp indicates a value that dropped by one below the value of the presently selected qp. Further, in Step S805, the QP deciding unit 115 initializes a parameter pg that indicates the number of the pixel group subject to processing. There are 16 pixel groups numbered from 0 to 15, so the parameter pg is initialized to 0. Further, in Steps S806 and S807, the QP deciding unit 115 sets a minus_size to the pg_size[qp] [pg], and sets a plus_size to the pg_size [new_qp] [pg]. Here, the minus_size indicates a code length of the selected pixel group based on the value of the present qp, and the plus_size indicates a code length of the selected pixel group based on the value of the new_qp obtained by subtracting 1 from the present qp. For example, assuming a case where pg is 0 and qp is 3, in the example shown in FIG. 9A, the minus_size is 30, and the plus_size is 32. This minus_size and plus_size are used in order to calculate the amount of change of the block code length of the encoding block assuming a case where the qp was changed by 1 in the pixel group unit.

In Step S808, the QP deciding unit 115 obtains a parameter tmp_size that indicates the block code length in a case where the qp was changed by 1 in the pixel group unit, from the above new_size, minus_size, and plus_size, according to Expression 3.

$$\text{tmp\_size} = \text{new\_size} - \text{minus\_size} + \text{plus\_size} \qquad \text{Exp. 3}$$

For example, assuming a case where pg is 0 and qp is 3, in the example shown in FIG. 9A, the new_size is 349, the minus_size is 30, and the plus_size is 32, so the tmp_size is 351.

Next, in Step S809, the QP deciding unit 115 decides whether or not the code length tmp_size after changing the qp, obtained in Step S808, is the target code amount (target_size) or less. If the value of the tmp_size exceeds the target code amount ('NO' in Step S809), processing moves to Step S814. On the other hand, if the value of the tmp_size is the target code amount or less ('YES' in Step S809), processing moves to Step S810. In Step S810, the QP deciding unit 115 updates the value of the new_size with the value of the tmp_size. Next, in Step S811, the QP deciding unit 115 updates the QPalt: pg_qp[pg] of the pixel group subject to processing to the value of the new_qp. In the afterward processing of Steps S812 and S813, pixel groups subject to processing continue to be updated. Specifically, in Step S812, the QP deciding unit 115 decides whether or not the number pg of the present pixel group subject to processing is smaller than a pixel group number maximum value (MAX_PG). The MAX_PG value is 15 in the case of the present embodiment. Here, when pg is smaller than the maximum value ('YES' in Step S812), processing moves to Step S813 where the QP deciding unit 115 updates the pg by 1, and then, returning to Step S806, processing is performed to decide the pixel group unit QPalt: pg_qp[pg] for a new pixel group. On the other hand, when pg is equal to the maximum value ('NO' in Step S812), processing moves to Step S814.

Next, in Step S814, the QP deciding unit 115 decides whether or not the value of the present qp is greater than 0, and also decides whether or not a value obtained by subtracting the present qp from the sel_qp is smaller than a MAX_DIFF. The MAX_DIFF prescribes a number of times that the qp can be lowered from the sel_qp. The MAX_DIFF can be decided arbitrarily according to the allowable range of QP values, and for example, can be set to 1, and in that case, it is possible to lower the qp value up to one times from the sel_qp value. In the above example, the sel_qp value is 3, so processing can be performed until the qp value is 2. Restricting the number of times in this way is done in order to restrict the execution time of recursive processing, but the MAX_DIFF may also be set to a value of 2 or 3. By setting the MAX_DIFF, it is possible to prescribe a number of types of QP that can be included in the QPalt in addition to the sel_qp.

In Step S814, the QP deciding unit 115 ends main processing in a case where the qp value is 0, or when the number of times that the qp value was lowered equals the MAX_DIFF ('NO' in Step S814). In a case where the qp value is greater than 0, and the number of times that the qp value was lowered is less than the MAX_DIFF ('YES' in Step S814), processing moves to Step S815. In Step S815, the QP deciding unit 115 reduces the qp value by 1, returns to Step S804, and repeats processing. The QPalt decided in this way, which is a candidate for the application QP, is output from the QP deciding unit 115 to the header omission determining unit 117.

Here, a specific example of the processing in FIG. 8 will be described with reference to FIG. 9A. Based on the selected sel_size (349 in the example in FIG. 9A), first, a block code length (349−30+32=351) is calculated for a case where the QP value of the pixel group of pixel group number 0 was reduced by 1, and this is compared to the target code amount (360). When the calculated block code length is the target code amount or less, a block code length is calculated for a case where the QP value of the next pixel group number 1 was reduced by 1, and this is likewise compared to the target code amount. The block code length of pixel group number 1 calculated at this time is (351−30+32=353), which is smaller than the target code amount. When pixel groups are selected in order and block code lengths are successively calculated in this way, the results are as follows.

Pixel group number 2: 353−24+24=353
Pixel group number 3: 353−20+22=355
Pixel group number 4: 355−20+22=357
Pixel group number 5: 357−20+22=359
Pixel group number 6: 359−16+18=361

Among the calculated block code lengths above, the block code length of pixel group number 6 is greater than the target code amount. Therefore, at this point in time main processing is ended. The specific QPalt values decided in this way are shown in FIG. 9B. In FIG. 9B, QP values corresponding to the code lengths surrounded by bold lines express the QPalt values that were decided for each pixel group. The respective QPalt values of the pixel group units are 2 for the pg_qp [0] to [5] and 3 for the pg_qp [6] to [15]. The block code length in which QP values are combined in this way is 359 bits, but for insufficient bits relative to the 360 bits of the target code amount, processing is performed to add padding bits with a multiplexing unit 123 of a later stage. The generated QPalt values are output from the QP deciding unit 115 and input to the header omission determining unit 117.

Thus, in the present embodiment, smaller QP values are assigned in order beginning from the head pixel group. In FIG. 9B, a minimum QP value was assigned to a plurality of pixel groups that are consecutive, including the head pixel group, but there are also cases where a minimum QP value is assigned to only the head pixel group by another condition.

Also, in a case where the value of the MAX_DIFF was 2 in the decision in Step S814, returning again to pixel group number 0, the QP value is further reduced by 1, and likewise block code lengths are successively calculated. In the above example, the results are as follows.

Pixel group number 0: 359−32+32=359
Pixel group number 1: 359−32+32=359
Pixel group number 2: 359−24+26=361

Here, the block code length of pixel group number 2 is greater than the target code amount. At this point in time the qp value is 1, so processing is ended. The respective QPalt values of the pixel group units decided in this way are 1 for the pg_qp [0] to [1], 2 for the pg_qp [2] to [5], and 3 for the pg_qp [6] to [15]. The block code length in which QP values are combined in this way is 359 bits. In the above example, a case is described in which the code length of the header information is considered, but in a case where the code length of the header information is not considered, it is sufficient to appropriately subtract the 23 bit code length of the header information from the above numerical values.

Operation of QP Deciding Unit 116

Next is a description of operation of the QP deciding unit 116. The QP deciding unit 116 has the same configuration as the QP deciding unit 115, but performs QP deciding processing corresponding to the header omission mode. In the header omission mode, the header information is set to only 1 bit of a header_skip_flg, all pixels within the pixel block undergo PCM encoding, and the assignment pattern of QP values for pixels within the encoding block is uniquely established. As a result, for any sort of input image, all pixels can certainly fit within the target code amount by performing PCM encoding. Also, by setting the header code length to 1 bit, it is possible to assign a large amount of code to image data.

All of the code lengths, which are input signals to the QP deciding unit 116, are code lengths resulting from performing PCM encoding processing. The same results are obtained in all pixel blocks with each encoding unit, so a configuration may be adopted in which a QP value is calculated for only the first pixel block. Also, in operation of the QP deciding unit 115, in Step S502, the added header code length hd_size was 23 bits, but in operation of the QP deciding unit 116, the same header code length hd_size is 1 bit. The data structure of this header information will be described later with reference to FIG. 10C. Also, in the QP deciding unit 116, it is not necessary to specify a pixel group number that changes the QP value, so it is not necessary to set a QP value in pixel group units, and thus the point of setting a QP value in pixel units differs from operation of the QP deciding unit 115.

Below, in operation of the QP deciding unit 116 in the flowcharts in FIGS. 5, 6, and 8, mainly points that differ from operation of the QP deciding unit 115 will be described, based on differences in the header code length hd_size. In operation of the QP deciding unit 116, QP values are decided in pixel units and not in pixel group units, so the pg value in each step is replaced with a pn value. The pn value has a value from 0 to 47.

In Step S502 in FIG. 5, a block code length bl_size[qp], obtained by adding a header information code length hd_size (=1 bit) and a total of the code lengths of all pixel groups, is calculated. FIG. 9C shows a specific example of the values of pn_size[qp] [pn] and bl_size[qp].

Next, in Step S503, the QP deciding unit 116 selects as the sel_size, from among bl_size[qp], a block code length that is a predetermined target code amount target_size or less and has a maximum value, and at this time qp is selected for the sel_qp. In the example shown in FIG. 9C, 337 (bits), which is the block code length bl_size[3] for QP: 3, is smaller than the target code amount target_size 360 bits, and is selected as the sel_size. Also, the QP value of 3 in this case is set to the sel_qp. Here, in a case where the code length of the header information is not included in the code length of the encoding block, the value of the target code amount is obtained by subtracting the code length of the header information from 360 bits. In the above-described example, the header code length is 1 bit, so the target code amount in this case is 359 bits.

In FIG. 8, in Step S801, the QP deciding unit 116 initializes the pn_qp[pn] that is a QPpcm of the pixel group unit with the QP: sel_qp that was decided in Step S503. At this time, all of the pn_qp[0] to the pn_qp[47] are initialized to the value of the sel_qp. In the example shown in FIG. 9C, QP=3 was selected so all of the pn_qp[0] to the pn_qp[47] are initialized to a value of 3. Next, in Step S802, the QP deciding unit 116 initializes the value of the parameter new_size, which indicates the code length of the encoding block at the present point in time, to the value of the sel_size that was decided in Step S603. For example, in the example shown in FIG. 9C, the sel_size was decided as the block code length 337 for a QP value of 3, so in Step S802, the value of the new_size is initialized to 337. In a case where the header code length is not considered, the block code length is 336. Next, in Step S803, the QP deciding unit 116 initializes the value of the parameter qp that indicates the presently selected QP with the value of the sel_qp that was decide in Step S604. For example, in the example shown in FIG. 9C, the sel_qp was decided as 3, so in Step S803 the qp value is initialized to a value of 3.

In Steps S806 and S807, the QP deciding unit 116 sets the minus_size to the pn_size[qp] [pn], and sets the plus_size to the pn_size[new_qp] [pn]. For example, assuming a case where pn is 0 and qp is 3, in the example shown in FIG. 9C, the minus_size is 7, and the plus_size is 8. This minus_size and plus_size are used in order to calculate the amount of change of the block code length of the encoding block assuming a case where the qp was changed by 1 in the pixel unit.

Regarding the tmp_size in Step S808, for example, assuming a case where pn is 0 and qp is 3, in the example shown in FIG. 9C, the new_size is 337, the minus_size is 7, and the plus_size is 8, so the tmp_size is 338.

Below, a specific example of the processing in FIG. 8 will be described with reference to FIG. 9C. Based on the selected sel_size (337 in the example in FIG. 9C), first, a block code length (337−7+8=338) is calculated for a case where the QP value of the pixel of pixel number 0 was reduced by 1, and this is compared to the target code amount (360). When the calculated block code length is the target code amount or less, a block code length is calculated for a case where the QP value of the next pixel number 1 was reduced by 1, and this is likewise compared to the target code amount. The block code length calculated at this time is (338−7+8=339), which is smaller than the target code amount. When pixels are selected in order and QP values are changed to successively calculate block code lengths in this way, the block code lengths increase by one corresponding to an increase in the pixel number by one. Also, the block code length equals 360 at pixel number 22.

Among the calculated block code lengths above, the block code length of pixel number 22 equals the target code amount, so at this point in time main processing is ended. The specific QPpcm values decided in this way are indicated by the bold frame in FIG. 9C. In FIG. 9C, QP values corresponding to the code lengths surrounded by bold lines express the QPpcm values that were decided for each pixel by the QP deciding unit 116. The respective QPpcm values of the pixel units are 2 for the pn_qp [0] to [22] and 3 for the pn_qp [23] to [47]. The block code length in which QP values are combined in this way is 360 bits, which equals the 360 bits of the target code amount. The generated QPpcm values, which serve as candidates for the application QP values, are output from the QP deciding unit 116 and input to the header omission determining unit 117.

Above, a flow of processing to decide the QPpcm values was disclosed for the sake of description, but in the case of PCM encoding, the QP values assigned to each pixel are decided uniquely according to the compression ratio (target code amount of the pixel block). Therefore, a configuration may also be adopted in which the QP deciding unit 116 stores in advance a QP pattern corresponding to the compression ratio. For example, in a case where the target code amount of the pixel block is 360 bits, as shown in FIG. 9C, data of pixel numbers 0 to 22 is encoded with a QP value of 2, and data of pixel numbers 23 to 47 is encoded with a QP value of 3. Also, above, QPpcm values were decided for pixel units, but QPpcm values may also be decided for pixel group units, as with the QP deciding unit 115.

Header Omission Determining Unit

Next is a description of operation of the header omission determining unit 117. The header omission determining unit 117 determines, for an encoding block unit, which to select among a first encoding mode in which PCM and DPCM can be mixed and a second encoding mode fixed to PCM. Also, based on the results of that determination, the header omission determining unit 117 decides the application QP used by the encoding unit 111E of the actual encoding system 120 to be which of the QPalt and the QPpcm that were input respectively from the QP deciding units 115 and 116.

Figure 11:
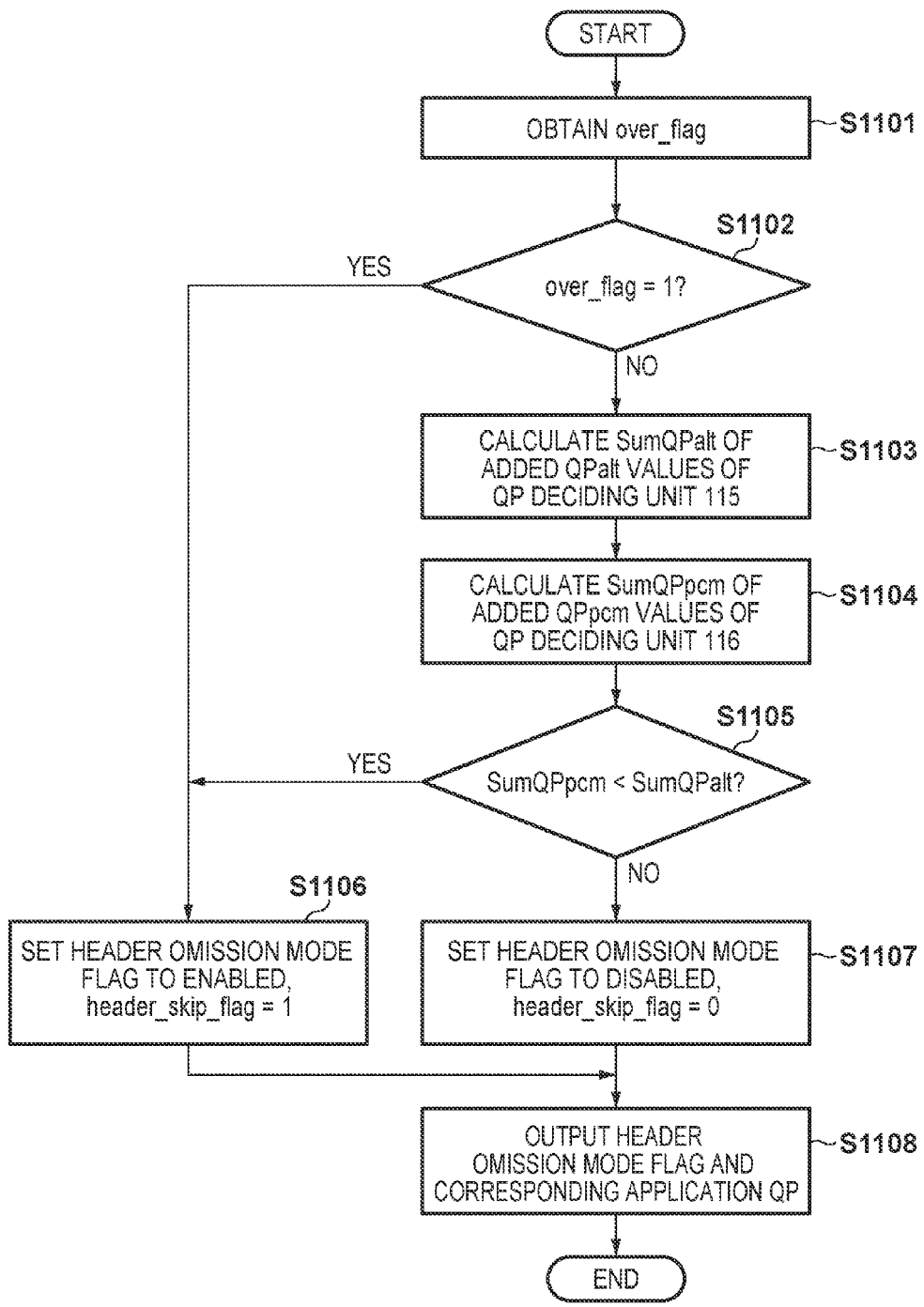
FIG. 11 is a flowchart showing an example of processing in a header omission determining unit corresponding to an embodiment of the invention.

FIG. 11 is a flowchart showing an example of processing executed by the header omission determining unit 117. The header omission determining unit 117 determines which encoding mode to adopt based on the value of the over_flag that was output by the QP deciding unit 115, and the total of QP values in each of the first encoding mode and the second encoding mode.

Specifically, the header omission determining unit 117, first, in Step S1101, obtains the over_flag from the QP deciding unit 115. Next, in Step S1102, the header omission determining unit 117 determines whether or not the value of the over_flag is 1. If the value is 1 ('YES' in Step S1102), processing moves to Step S1106. In this case, in the first encoding mode in which PCM and DPCM can be mixed, the code amount of the encoding block cannot be equal to or less than the target code amount, so the second encoding mode in which encoding is performed fixed to PCM is selected. On the other hand, if the value is 0 ('NO' in Step S1102), processing moves to Step S1103. In Step S1103, a total value SumQPalt of the QPalt values output by the QP deciding unit 115 within the encoding block is calculated. Also, in Step S1104, a total value SumQPpcm of the QPpcm values output by the QP deciding unit 116 within the encoding block is calculated.

In Step S1105, the total QP values that were calculated in Steps S1103 and S1104 are compared. Here, when the value of the SumQPpcm is the value of the SumQPalt or more (NO in Step S1105), processing moves to Step S1107, and when the value of the SumQPpcm is less than the value of the SumQPalt (YES in Step S1105), processing moves to Step S1106. In Step S1106, the header omission mode flag is set to enabled (header_skip_flg=1), and processing moves to Step S1108. On the other hand, in Step S1107, the header omission mode flag is set to disabled (header_skip_flg=0), and processing moves to Step S1108.

Next, in Step S1108, according to the above header omission mode flag that was set and the setting value of that flag, a QP value that was output by one among the QP deciding units 115 and 116 is output as the application QP value to the encoding unit 111E and the multiplexing unit 123 of the actual encoding system 120. The header omission determining unit 117 outputs the QPalt value as the application QP value to the actual encoding system 120 in a case where the first encoding mode, in which PCM and DPCM are mixed, was set. Also, the header omission determining unit 117 outputs the QPpcm value as the application QP value to the actual encoding system 120 in a case where the second encoding mode, in which PCM is fixed, was set. In this way, the code amount of the encoding block can be reliably set to the target code amount or less, and the encoding mode having the smaller total QP value can be selected from among the first encoding mode and the second encoding mode.

In the above-described examples in FIGS. 9B and 9C, the total QPalt value of the encoding mode in which PCM and DPCM can be mixed is 126, and the total QPpcm value of the encoding mode in which PCM is fixed is 121. Thus, in the actual encoding system 120 of a later stage, compression encoding is performed fixed to the PCM mode.

In the processing of FIG. 11, the total QP value in the encoding block is used as an indicator that indicates the degree of image quality degradation caused by quantization error for the original image, and the encoding having the smaller total QP value is decided as the encoding scheme. Also, even in a case where the code amount of the encoding block obtained in the first mode in which PCM and DPCM can be mixed cannot be equal to or less than the target code amount, in the second encoding mode in which PCM is fixed, the code amount of the encoding block can certainly fit within the target code amount while also suppressing a deterioration in image quality by assigning a maximum amount of code to the pixel data.

Description of Operation of Actual Encoding System

Next is a description of operation of the actual encoding system 120 in FIG. 1B. The same image as the image data that was input to the provisional encoding system 110 is also input to the actual encoding system 120, but it is necessary to wait until the header omission determining unit 117 of the provisional encoding system 110 decides and outputs the application QP value and the header omission mode flag. Consequently, the input image data is input to the delay unit 121, and is delayed by the extent of a predetermined processing cycle necessary for the provisional encoding system 110 to decide the application QP value and the header omission mode flag. After being delayed, the image data is output from the delay unit 121 to the encoding unit 111E. Therefore, the encoding unit 111E is able to perform encoding of an encoding block regarding which the provisional encoding system 110 has decided the application QP value, using the application QP value that was decided.

The encoding unit 111E has the same configuration as the encoding unit 111 shown in FIG. 3, and performs actual encoding of the delayed image data using the application QP value. Thus, code data having the same code length as the block code length that was decided by the QP deciding unit 115 or 116 is generated, and is output to the multiplexing unit 123 along with the PCM/DPCM selection flag and the selected code length. The code data, the selected code length, and the PCM/DPCM selection flag from the encoding unit 111E, and the QP value and the header omission mode flag from the header omission determining unit 117, are input to the multiplexing unit 123, and multiplexing in accordance with a predetermined format is performed on each code block. The multiplexing unit 123 performs multiplexing according to some format in FIGS. 10B and 10C disclosed below according to the value of the header omission mode flag, generates encoded data, and outputs the encoded data that was generated.

Figure 10A:
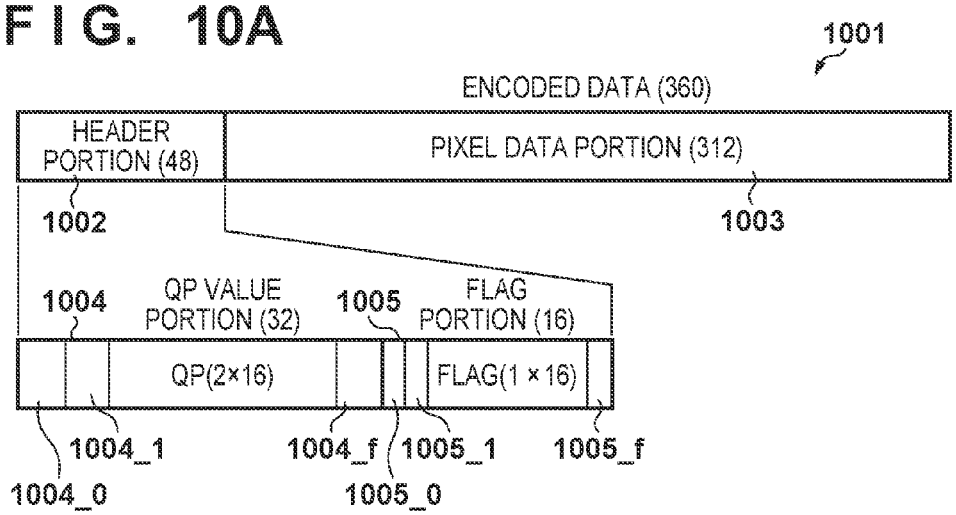
FIGS. 10A to 10C show an example of an encoded data format corresponding to an embodiment of the invention.

Below, an exemplary encoded data format corresponding to an embodiment of the invention will be described with reference to FIGS. 10A to 10C. FIG. 10A shows an exemplary encoding format data structure. The numerical values shown in parentheses indicate the number of bits of data stored in each region. FIG. 10A shows a format in which QP values assigned to each pixel group of the encoding block, and PCM/DPCM flag information, are stored for all pixel groups. An encoded data 1001 of the entire block (360 bits) is composed of a header portion 1002 (48 bits) and a pixel data portion 1003 (312 bits). The header portion 1002 is composed of a QP value portion 1004 (32 bits) that stores QP values, and a flag portion 1005 (16 bits) that stores PCM/DPCM selection flags. In the QP value portion 1004, 16 items of 2-bit QP values (1004_0 to 1004_$f$) are stored for each pixel group. In the flag portion 1005, 16 items of flag values of the 1-bit PCM/DPCM selection flag (1005_0 to 1005_$f$) are stored for each pixel group. In the pixel data portion 1003, code data for the number of pixels (code data for 3×16=48 pixels) is stored.

As this sort of format, an encoding format corresponding to the present embodiment, in which the size of the header portion is reduced and to that extent a large size can be insured for the pixel data portion, is disclosed below. First, in the application QP set shown in FIG. 9B, the same QP values are assigned in a consecutive portion of the pixel groups including the beginning of the pixel groups, and different QP values are assigned in the remaining pixel groups. The change of the QP values is a step of one. Based on these sorts of properties, in the encoding format corresponding to the present embodiment, it is not necessary to hold all of the QP values included in the encoding block. Instead, the header portion includes the first (pixel group number: 0) QP value, and information of the pixel group number that indicates the position where the QP value changes. As one example, the first QP value is indicated by qp0, and the pixel group number where the QP value changes is indicated by qp_pos. Also, above, the QP value to be stored is the first QP value, i.e., the smallest QP value, but similar effects are also obtained in a case where the largest QP value that has been assigned is stored. The reason for this is that, in this case as well, the correct QP value assignment can be reproduced as long as the switching position can be specified. Also, in the present embodiment, it is possible to further reduce the size of the header portion according to the value of the header omission mode flag. Below, an example of the encoding format corresponding to the present embodiment will be described with reference to FIGS. 10B and 10C.

Figure 10B:
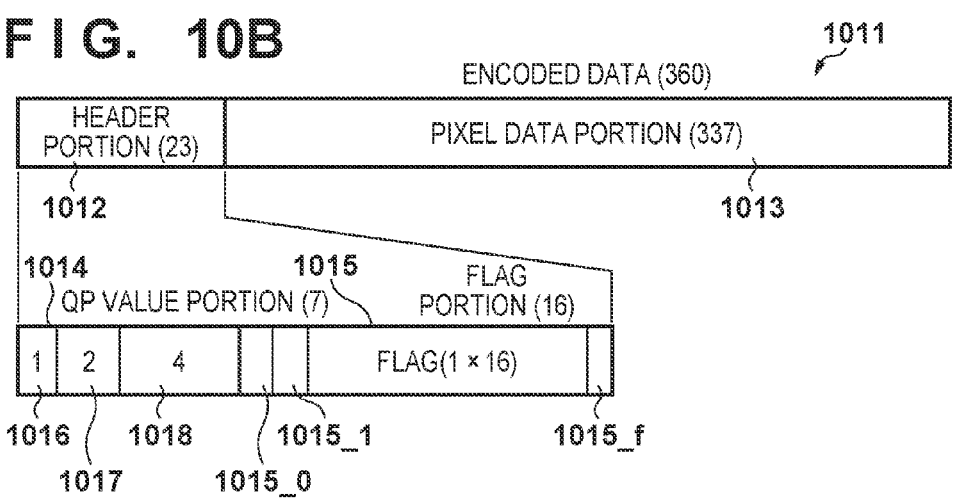

First, FIG. 10B shows an exemplary encoding format data structure in a case where the header omission mode flag is set to disabled (0). An encoded data 1011 of the entire block (360 bits) is composed of a header portion 1012 (23 bits) and a pixel data portion 1013 (337 bits). The header portion 1012 is composed of a QP value portion 1014 (7 bits) that stores QP values, and a flag portion 1015 (16 bits) that stores PCM/DPCM selection flags. In the QP value portion 1014, 1 bit of the header omission mode flag (1016), 2 bits of the qp0 (1017), and 4 bits of the qp_pos (1018) are stored. In the example shown in FIG. 9B, values of (0, 2, 6) are stored. In the flag portion 1015, 16 items of flag values of the 1-bit PCM/DPCM selection flag (1015_0 to 1015_$f$) are stored for each pixel group. In the pixel data portion 1013, code data that is variable length code for the number of pixels (code data for 3×16=48 pixels) is stored. The multiplexed encoded data 1011 is output to an output terminal 102 as stream data, and is output to an unshown image memory and bus interface. In the format as shown in FIG. 10B, the size of the header portion is reduced by 25 bits compared to the format in FIG. 10A, and that size can be allotted to the pixel data portion.

Figure 10C:
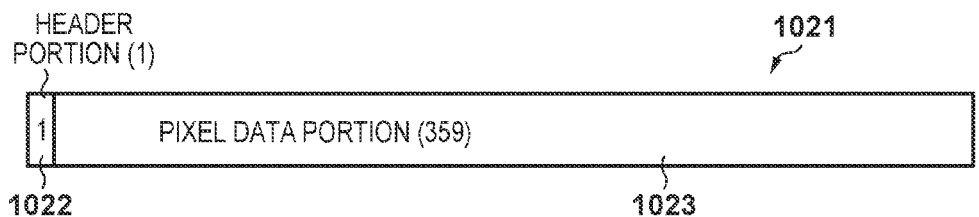

Next, FIG. 10C shows an exemplary encoding format data structure in a case where the header omission mode flag is set to enabled (1). An encoded data 1021 of the entire block (360 bits) is composed of a header portion 1022 (1 bit) and a pixel data portion 1023 (359 bits). As described above, in the header omission mode, each pixel data QP value is uniquely decided in the pixel block. Therefore, only the header omission mode flag is stored in the header portion 1022, and the qp0 and the 4 bits of the qp_pos in FIG. 10B are omitted. In a case where this format is used, a value of 1 is stored for the header omission mode flag. In the pixel data portion 1023, code data that is variable length code for the number of pixels (code data for 3×16=48 pixels) is stored. The multiplexed encoded data 1021 is output to the output terminal 102 as stream data, and is output to an unshown image memory and bus interface. In the format as shown in FIG. 10C, information other than the 1 bit of the header omission mode flag is unnecessary, so the size of the header portion is further reduced by 22 bits compared to the format in FIG. 10B. In comparison to FIG. 10A, the header portion is 47 bits smaller, and that size can be allotted to the pixel data portion.

Thus, in the present embodiment, by introducing 1 bit of flag information indicating that all pixels of the encoding block were encoded fixed to PCM encoding, other information than that flag information can be omitted from the header portion, thereby reducing the size of the header portion to 1 bit. As a result, it is possible to increase the code amount within the target code amount that is assigned to the pixel data portion, and depending on the input image, encoding is possible with a smaller QP value than the QPalt value that was decided by the QP deciding unit 115, so an effect of reducing image quality degradation can be obtained.

Description of Image Decoding Unit

Figure 2:
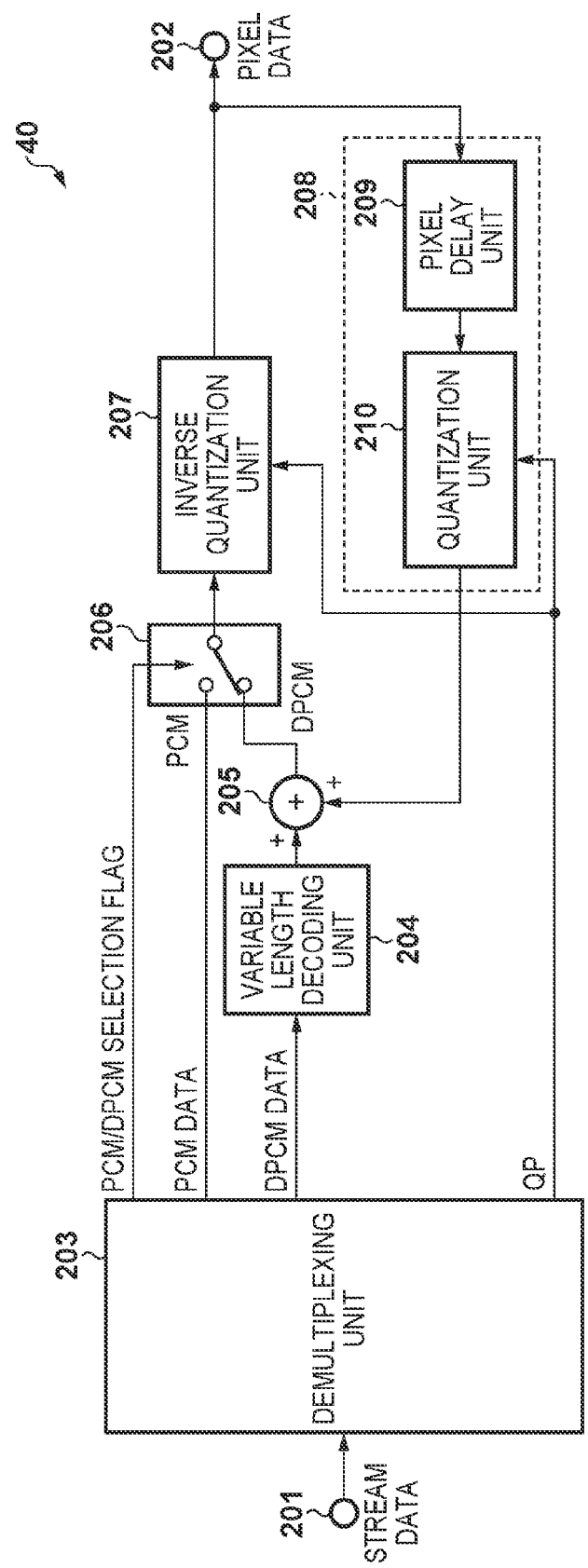
FIG. 2 is a block diagram showing an exemplary configuration of an image decoding unit corresponding to an embodiment of the invention.

Next, an exemplary configuration and operation of an image decoding unit corresponding to an embodiment of the invention, which decodes the encoded data that was generated by the image encoding unit 20, will be described. FIG. 2 is a block diagram showing an exemplary configuration of an image decoding unit 40 corresponding to an embodiment of the invention. The image processing apparatus 100 has the image decoding unit 40, and is capable of decoding encoded data that was stored in the memory 30. Below, operation of each block in an exemplary configuration of the image decoding unit of the present embodiment will be described.

The image decoding unit 40 shown in FIG. 2 is configured with a demultiplexing unit 203, a variable length decoding unit 204, an adder 205, a selector 206, a inverse-quantization unit 207, and a prediction unit 208. The image decoding unit 40 may be configured as a single body in hardware using a dedicated device, logic circuit, or memory, and alternatively, the image decoding unit 40 may be configured in a distributed manner with a plurality of devices or the like. Alternatively, the image decoding unit 40 may be configured in software by a computer such as a CPU executing a processing program stored in a memory.

In the image decoding unit 40, through an unshown image memory, bus interface, or the like, stream data that was generated by the image encoding unit 20 is input to the demultiplexing unit 203 through an input terminal 201. The demultiplexing unit 203 decodes that stream data that was input according to a predetermined format, separates the QP values, the PCM/DPCM selection flags, and the information of code data, and successively outputs these at each processing cycle. Also, the demultiplexing unit 203, when the header omission mode flag in the header indicates disabled (value 0), afterward successively outputs the values indicated by the multiplexed PCM/DPCM selection flags. Also, based on the first QP value and information of the position where QP values change, which are included in the header information, the QP values are output at predetermined times to the inverse-quantization unit 207 and a quantization unit 210.

When the header omission mode flag in the header indicates enabled (value 1), the demultiplexing unit 203, with respect to all pixels of this block, outputs a value indicating the PCM mode as the PCM/DPCM selection flag. Also, QP values are output to the inverse-quantization unit 207 and the quantization unit 210 based on a QP pattern of each pixel that has been determined in advance, and the PCM/DPCM selection flag is output to the selector 206. This QP pattern may be calculated by the same processing as in the QP deciding unit 116, or a value calculated in advance may be held by the demultiplexing unit 203. Among the code data, PCM data is output to the selector 206, and DPCM data is output to the variable length decoding unit 204. The variable length decoding unit 204 performs variable length decoding of the DPCM data that was input, and outputs the decoded DPCM data to the adder 205. The adder 205 adds a predicted value from the later-described prediction unit 208 to the decoded DPCM data to obtain a decoded value, and outputs this decoded value to the selector 206.

The selector 206 switches between the PCM data from the demultiplexing unit 203 and the decoded value from the adder 205 according to the PCM/DPCM selection flag, and outputs the result as quantized data to the inverse-quantization unit 207. The inverse-quantization unit 207 uses the QP values to perform inverse-quantization on the quantized data from the selector 206 and generate decoded image data, and this decoded image data is output to the prediction unit 208 and an output terminal 202. The prediction unit 208 is configured with a pixel delay unit 209 and the quantization unit 210. The decoded image data that was input from the inverse-quantization unit 207 is delayed by the pixel delay unit 209 in color element portions such that prior values of the same color element become predicted values, and then the delayed image data is quantized by the quantization unit 210 and output as predicted values. Note that for the first pixel of the encoding block of each color element, a value of 0 is output as a predicted value because a prior pixel does not exist. The decoded image data that was output from the inverse-quantization unit 207 is output to outside through the output terminal 202.

Thus, in the present embodiment, encoding is performed with a fixed length for each encoding target block that is composed of a plurality of pixel groups, so first, provisional encoding is performed with a plurality of QP values in the provisional encoding system and code amounts are obtained, and QP values applied to pixel group units are decided from those code amounts. Next, in the actual encoding system, actual encoding is performed using the application QP values that were decided. Thus, the QP values of each pixel group can be decided such that the block code length of the encoding block has a maximum value that does not exceed a predetermined value. Thus, with efficient encoding in block units, it is possible to reduce image quality degradation that occurs in image data when there is a large difference between adjacent pixels.

Further, the format of encoded data is defined separately for encoded data corresponding to the first encoding mode in which PCM/DPCM can be switched between pixel group units, and encoded data corresponding to the second encoding mode in which all pixel groups (pixels) are encoded fixed to PCM encoding. Also, based on the encoding format, QP values applied to the actual encoding system are obtained for the first encoding mode and the second encoding mode respectively, and the mode having the smallest total QP value is selected. Thus, it is possible to perform efficient encoding while also reducing quantization error in encoding block units to suppress image quality degradation.

Also, in a case where the code amount of the encoding block obtained in the first encoding mode cannot be equal to or less than the target code amount, the code amount of the encoding block obtained in the second encoding mode can reliably be equal to or less than the target code amount. Particularly, in the data format of header information corresponding to the second encoding mode, the QP value and the PCM/DPCM selection are uniquely decided for each pixel within the pixel block, and the header omission mode having only 1 bit of header information is defined. Thus, in a case where the code amount of the encoding block obtained in the first encoding mode cannot be equal to or less than the target code amount, the code amount of the encoding block can certainly fit within the target code amount while also suppressing a deterioration in image quality by assigning a maximum amount of code to the pixel data.

Also, in the present embodiment, even in a case where there is a large difference between adjacent pixels, the code length is not forcibly halved from 10 bits to 5 bits in the case of PCM encoding as in Japanese Patent Laid-Open No. 2010-004514. Instead, the encoding scheme with the shorter code length in the respective encoding results of PCM encoding and DPCM encoding is selected for each pixel group, using a plurality of quantization steps that have been set in steps including quantization step 1. Further, in the present embodiment, the quantization step is selected in consideration of not only the code length of group units, but also the block code length of the encoding block. Therefore, even if the code length is large in some pixel groups, this is offset if the code length is small in other pixel groups. Thus, even if a steep edge is included within the encoding block and a large code length is consumed by that edge component, if there is a flat region before or after the edge, the portion of the code length of the edge is absorbed by the flat region. As a result, when encoding edge components, it is not necessary to eliminate bits unnecessarily as with Japanese Patent Laid-Open No. 2010-004514.

In the embodiment of the invention described above, the number of bits of image data is not limited to 10 bits, and may be a different number of bits such as 8 bits or 12 bits. Also, the block size is not limited to 16 pixels horizontally×1 pixel vertically, and may be an arbitrary size. For example, a configuration with a two-dimensional structure such as 4 pixels horizontally×4 pixels vertically may also be adopted.

Further, the format of the image data subject to encoding is not limited to RGB image data, and may also be an image data format such as gray scale image data, or among color image data formats, YCbCr image data, Bayer array data, or the like. In FIG. 4B, the image data format includes a luminance signal (Y) and two color difference signals (Cr, b), and the relationship between pixel data and pixel groups that compose an encoding block in the case of YCbCr 4:2:2 is shown. In the example shown in FIG. 4B, 2 pixels of Y and 1 pixel each of Cb and Cr, for a total of 4 pixels, form a unit pixel group, and an encoding block is composed of 4×8=32 pixels. Here, the number of pixel groups included in the encoding block may be more than 8 groups. In FIG. 4C, the relationship between pixel data and pixel groups that compose an encoding block in a case where the image data format is a Bayer array is shown. In the example shown in FIG. 4C, 2 pixels of G and 1 pixel each of R and B, for a total of 4 pixels, form a unit pixel group, and an encoding block is composed of 4×8=32 pixels. Here, the number of pixel groups included in the encoding block may be more than 8 groups. An encoding block for a gray scale image is not shown, but it is possible to compose a pixel group from a group of adjacent pixels among the pixels that compose the gray scale image. In that case, it is possible for a unit pixel group to include 3 or 4 adjacent pixels, for example.

Second Embodiment

In the above first embodiment, as shown in FIG. 10B, regions indicating the header omission mode flag and the QP values are independently provided in the header information, and a header region having a fixed length of 3 bits is used. However in the present embodiment, these are combined and handled as variable length code.

FIGS. 12A to 12C show an example of an encoded data format corresponding to the present embodiment. First, FIG. 12A shows an example of code word assignment. In the present embodiment, code words of 2 bits or 3 bits are assigned according to the combination of the header omission mode flag value and the QP value. The QP value can have any of four values from 0 to 3, but when the QP value is 2 or 3, assignment such that the code word becomes shorter is possible. This is because when the QP value is larger and the quantization step is coarser, a larger code amount can be assigned to the pixel data, and so image quality degradation can be suppressed. Also, when the value of the header omission mode flag is 1, the QP value does not need to be encoded so a 2 bit code word is assigned. However, the code word assignment shown in FIG. 12A is only an example, and embodiments of the invention are not limited to this example.

FIG. 12B shows an exemplary encoding format data structure in a case where the header omission mode flag is set to disabled (0). An encoded data 1201 of the entire block (360 bits) is composed of a header portion 1202 (22 to 23 bits) and a pixel data portion 1203 (337 to 338 bits). The header portion 1202 is composed of a QP value portion 1204 (6 to 7 bits) that stores QP values, and a flag portion 1205 (16 bits) that stores PCM/DPCM selection flags. In the QP value portion 1204, a code word 1206 (2 to 3 bits) decided according to the combination of the header omission mode flag value and the qp0 value, and a qp_pos 1207 (4 bits) are stored. Also, in the flag portion 1205, 16 items of flag values of the 1-bit PCM/DPCM selection flag (1205_0 to 1205_f) are stored for each pixel group. In the pixel data portion 1203, code data that is variable length code for the number of pixels (code data for 3×16=48 pixels) is stored.

FIG. 12C shows an exemplary encoding format data structure in a case where the header omission mode flag is set to enabled (1). An encoded data 1211 of the entire block (360 bits) is composed of a header portion 1212 (2 bits) and a pixel data portion 1213 (358 bits). The header omission mode flag value is stored in the header portion 1212. In the pixel data portion 1203, code data that is variable length code for the number of pixels (code data for 3×16=48 pixels) is stored. In FIG. 12C, the code length of the header portion 1212 is 2 bits, and the code length of compressed pixel data is 358 bits, so in comparison to the case of the first embodiment, the code amount assigned to compressed pixel data is reduced locally. However, it is assumed that ordinarily, encoding in the first encoding mode is performed more often, so image quality degradation can be suppressed for the total of an entire frame or sequence.

In the case of the present embodiment, the QP deciding unit 115 uses the header code length corresponding to the first QP value to decide the QPalt value by the method of the first embodiment. Also, the QP deciding unit 116, according to code assignment information decided by a code assignment unit 1301, uses a header code length of 2 bits to decide the QPpcm value by the method of the first embodiment. The multiplexing unit 123 performs multiplexing according to the format shown in FIGS. 12B and 12C, according to the value of the header omission mode flag and the value of the first QP value of the application QP values.

Also, the demultiplexing unit 203 of the image decoding unit 40 corresponding to the present embodiment, referring to the first 2 bits of the header portion, performs the operation for a case where the header omission mode flag indicates enabled (value 1) when those 2 bits indicate '11'. When the first 2 bits do not indicate '11', the operation for a case where the header omission mode flag indicates disabled (value 0) is performed. In this case, when the first 2 bits do not indicate '10' or '01', the demultiplexing unit 203 refers to the first 3 bits of the header portion, and judges whether they indicate '000' or '001'. In the present embodiment, as shown in FIG. 12C, fixed code words are assigned in advance, so after specifying the QP values according to the assignment, operation in the same manner as in the first embodiment is executed.

As described above, in the present embodiment, the header omission mode flag and the QP values are combined in the header information and handled as variable length code. Thus, the number of bits of header information is made variable, and so quantization parameters can be decided in consideration of the number of bits of header information that occupies the total amount of encoded data due to provisional encoding. Therefore, it is possible to appropriately assign bits to image data, and particularly when the QP value is larger and the quantization step is coarser, a larger code amount can be assigned to the pixel data, and so image quality degradation can be suppressed.

Third Embodiment

In the above second embodiment, fixed code words are assigned for combinations of the header omission mode flag and QP values. However in the third embodiment, it is possible to suppress image quality degradation by assigning the shortest code word to the encoding mode having the highest selection frequency, based on the selection status of the encoding mode of the frame unit.

Figure 13:
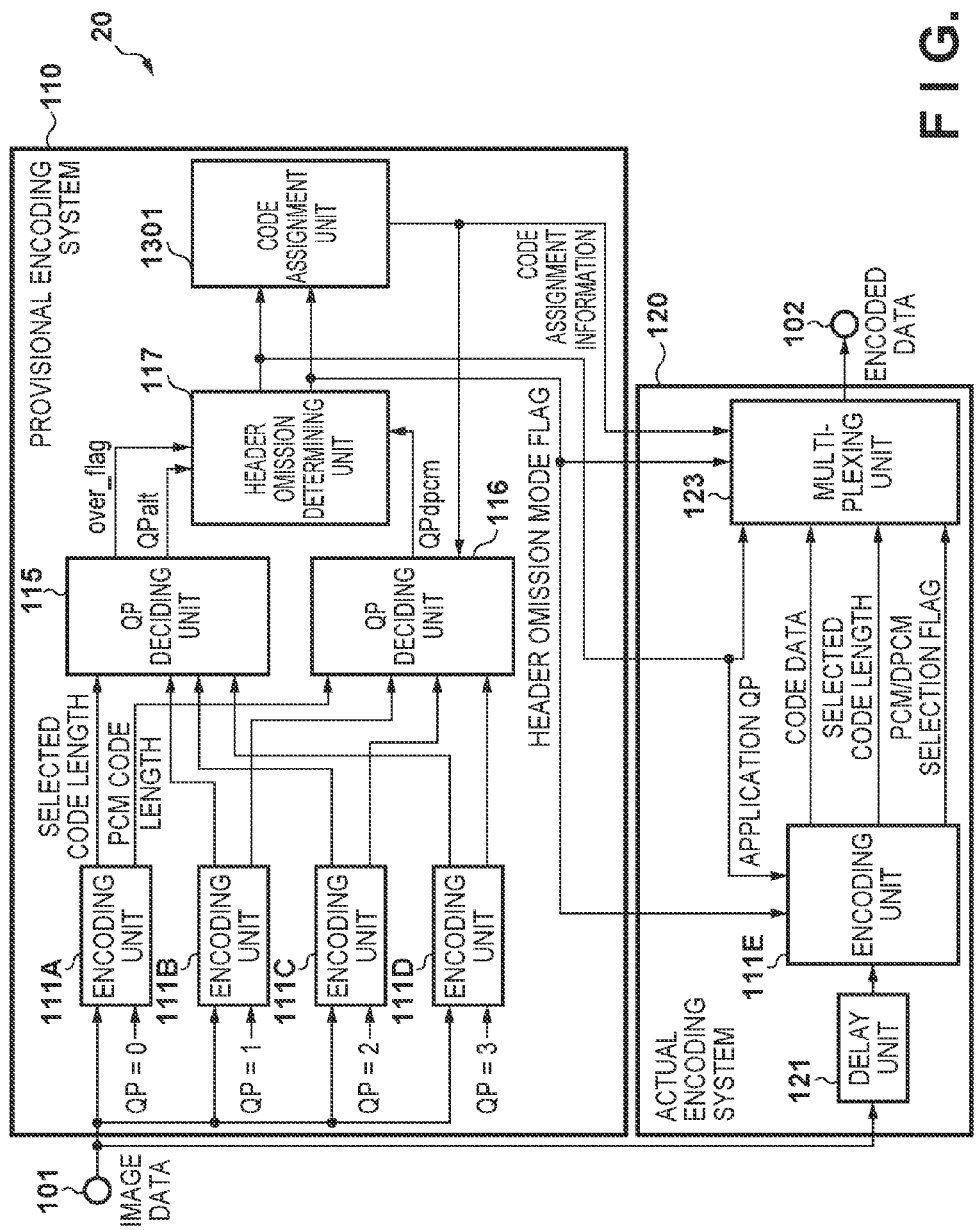
FIG. 13 is a block diagram showing an exemplary configuration of an image encoding unit corresponding to a third embodiment of the invention.

FIG. 13 is a block diagram showing an exemplary configuration of the image encoding unit 20 according to the present embodiment. The image encoding unit 20 of the present embodiment differs from the image encoding unit 20 described in the first embodiment by the points that that the code assignment unit 1301 is added, and the code assignment information that is output by the code assignment unit 1301 is input to the QP deciding units 115 and 116, and the multiplexing unit 123. Otherwise, the image encoding unit 20 has the same configuration as in the first embodiment. Therefore, the overall operation of the image encoding unit 20 is the same as in the first embodiment, so only operation specific to the present embodiment is described in detail below.

The application QP values of each pixel block, and the header omission mode flag, are input to the code assignment unit 1301 from the header omission determining unit 117. Based on this input, the code assignment unit 1301 calculates the number of times (frequency) that each QP value was selected and the number of times (frequency) that the header omission mode was selected for each frame. The code assignment unit 1301 decides code assignment such that a code word having the shortest code length is assigned to the QP value having the highest frequency of selection in a frame preceding the frame subject to processing. The preceding frame may be an immediately prior frame, or may be a plurality of preceding frames. The code assignment unit 1301 outputs the decided code assignment as code assignment information to the QP deciding units 115 and 116, and the multiplexing unit 123. In the case of the first frame, a predetermined initial value is used.

Figure 14A:
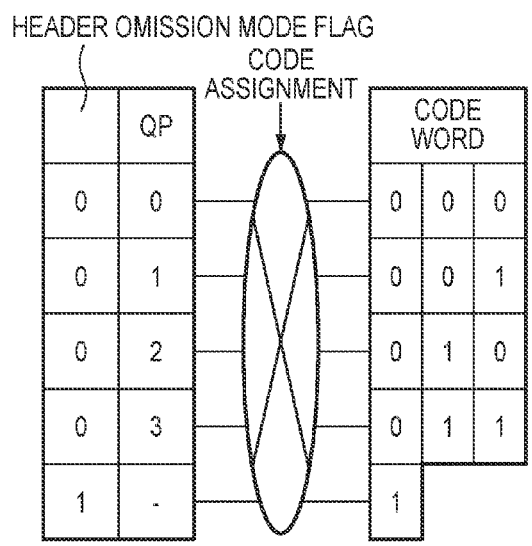
FIGS. 14A to 14C show an example of an encoded data format corresponding to a third embodiment of the invention.
Figure 14B:
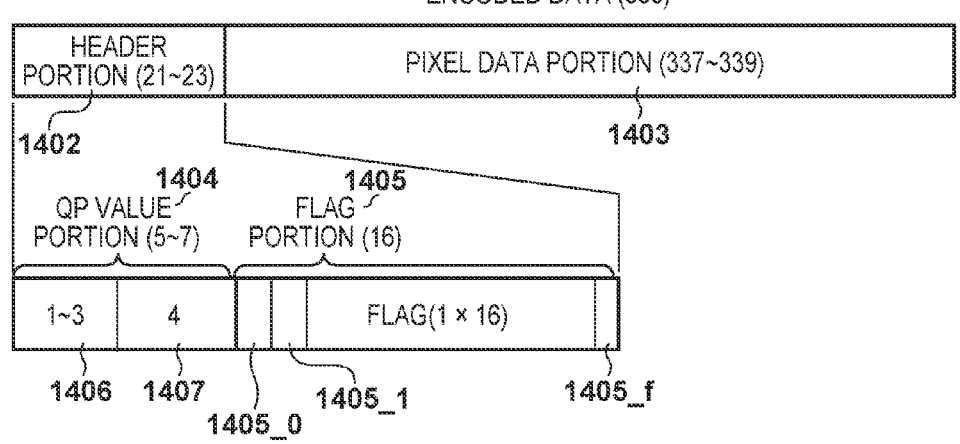
Figure 14C:
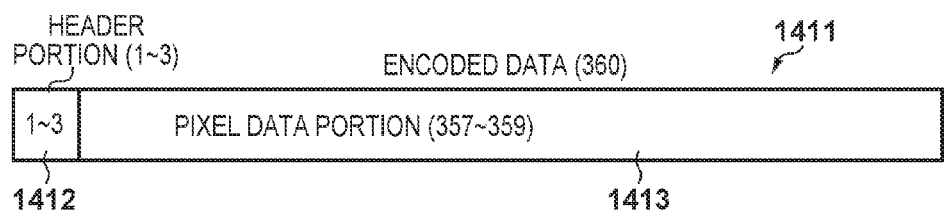

In the present embodiment, the items listed on the right side of FIG. 14A are used as code words. FIGS. 14A to 14C show an example of an encoded data format corresponding to the present embodiment. In the present embodiment, one code word is prepared having a code length of 1 bit as the shortest code length, and other than this, four code words having a code length of 3 bits are used. As code words, '000', '001', '010', and '011' are used, but the most significant bit overlaps the 1 bit code word and therefore is not used. For example, when a QP value of 2 is selected the most times (has the highest selection frequency), the 1 bit code word is assigned to the QP value of 2. A 3 bit code word is assigned to other values, including the header omission mode. An arbitrary assignment method may be used when doing so, but for example, assignment may be performed in order from the smallest QP value, and lastly in order of the header omission mode. This allows a greater code amount to be assigned to pixel data for the QP value having the highest usage frequency, thereby suppressing image quality degradation.

The QP deciding unit 115, according to the code assignment information decided by the code assignment unit 1301, uses the header code length corresponding to the first QP value to decide the QPalt value by the method of the first embodiment. Also, the QP deciding unit 116, for the header code length according to the code assignment information decided by the code assignment unit 1301, decides the QPpcm value by the method of the first embodiment. The multiplexing unit 123 performs multiplexing according to the format shown in FIGS. 14B and 14C, according to the code assignment information decided by the code assignment unit 1301. The code assignment information is stored in frame header information arranged in encoded data at the beginning of a frame, and notification of the code assignment information is given to the image decoding unit 40.

FIG. 14B shows an exemplary encoding format data structure in a case where the header omission mode flag is set to disabled (0). An encoded data 1401 of the entire block (360 bits) is composed of a header portion 1402 (21 to 23 bits) and a pixel data portion 1403 (337 to 339 bits). The header portion 1402 is composed of a QP value portion 1404 (5 to 7 bits) that stores QP values, and a flag portion 1405 (16 bits) that stores PCM/DPCM selection flags. In the QP value portion 1404, a code word 1406 (1 to 3 bits) decided according to the combination of the header omission mode flag value and the qp0 value, and a qp_pos 1407 (4 bits) are stored. In the flag portion 1405, 16 items of flag values of the 1-bit PCM/DPCM selection flag (1405_0 to 1405_f) are stored for each pixel group. In the pixel data portion 1403, code data that is variable length code for the number of pixels (code data for 3×16=48 pixels) is stored.

FIG. 14C shows an exemplary encoding format data structure in a case where the header omission mode flag is set to enabled (1). An encoded data 1411 of the entire block (360 bits) is composed of a header portion 1412 (1 to 3 bits) and a pixel data portion 1413 (357 to 359 bits). Any among the five code words in FIG. 14A is stored in the header portion 1412. When the number of times that the header omission mode flag is enabled is greatest within a single frame, the size of the header portion 1412 is 1 bit. When the number of times any QP value is selected is greater than the number of times that the header omission mode flag is enabled, the size of the header portion 1412 is 3 bits.

In the pixel data portion 1413, code data that is variable length code for the number of pixels (code data for 3×16=48 pixels) is stored. In FIG. 14C, the code length of the header portion 1412 is 3 bits, and this includes a case where the code length of compressed pixel data is 357 bits. In comparison to the cases of the first and second embodiments, there are also cases where the code amount assigned to the pixel data portion is reduced locally. However, a greater code length is assigned to the pixel data portion for conditions with the greatest frequency of occurrence, so image quality degradation can be suppressed for the total of an entire frame or sequence.

Also, the demultiplexing unit 203 of the image decoding unit 40 corresponding to the present embodiment determines the header omission mode flag and the QP values according to the code assignment information received in advance from the image encoding unit 20. Also, operation when the header omission mode flag is enabled (value 1), and operation regarding each QP value when the header omission mode flag is disabled (value 0), are performed in the same manner as in the first embodiment.

In the present embodiment, when the header omission mode flag and the QP values are combined in the header information and handled as variable length code, code word assignment is performed based on the frame unit selection frequency. Thus, it is possible to assign the shortest code word to the encoding mode having the highest usage frequency in a frame unit, and thereby shorten on average the code amount of the header portion. Thus, it is possible to assign a greater code amount to the pixel data portion, and possible to suppress image quality degradation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-116027, filed on Jun. 8, 2015, which is hereby incorporated by reference herein in its entirety.

What is claimed is:

1. An image processing apparatus comprising:
an acquiring unit configured to acquire an encoding target block having a plurality of groups each including a predetermined number of pixels;
a deciding unit configured to decide, for each group, a quantization parameter used to quantize image data of the group and an encoding scheme so that a code length of the encoding target block does not exceed a predetermined value corresponding to a target code amount of the encoding target block, wherein the deciding unit selects, as the encoding scheme of respective groups, either of a first encoding scheme that outputs quantized image data or a second encoding scheme that outputs encoded data of a differential between quantized image data and prediction data; and
an encoding unit configured to generate encoded data by encoding image data of the encoding target block in accordance with the quantization parameters and the encoding schemes decided for the respective groups by the deciding unit,
wherein the deciding unit is further configured to assign, as the quantization parameter of the respective groups, either a first quantization parameter or a second quantization parameter corresponding to a quantization step smaller than a quantization step corresponding to the first quantization parameter, out of the plurality of quantization parameters, and
wherein the deciding unit selects as an encoding mode for the encoding target block either a first mode that selects either the first encoding scheme or the second encoding scheme as the encoding scheme for each group, by comparing sums of code lengths for each group resulting from encoding using each encoding scheme, or a second mode that selects the first encoding scheme as the encoding scheme of all groups of the encoding target block, and decides the quantization parameters and the encoding schemes of the plurality of groups of the encoding target block in accordance with the selected encoding mode,
wherein the deciding unit is further configured to select whichever of the first mode and the second mode has a smaller total of quantization parameters assigned to the plurality of groups of the encoding target block and to select the second mode regardless of the total of the quantization parameters, if the code length of the encoding target block obtained in the first mode is not the predetermined value or less.

2. An apparatus according to claim 1, wherein the encoding unit is further configured to set a code amount assigned to encoded data obtained in the first mode to less than a code amount assigned to encoded data obtained in the second mode.

3. An apparatus according to claim 1, wherein the deciding unit is further configured to decide, as the first quantization parameter, one of the plurality of quantization parameters so that a code length of encoded data of the encoding target block generated by quantizing all of the groups of the encoding target block using the first quantization parameter, and encoding using the encoding schemes decided for the respective groups does not exceed the predetermined value, and becomes a maximum value, and assigns the second quantization parameter to some of the groups of the encoding target block.

4. An apparatus according to claim 3, wherein the deciding unit is further configured to decide the some of the groups so that a total of a first total and a second total does not exceed the predetermined value, and becomes a maximum value,
   wherein the first total is a total of code lengths of encoded data generated by quantizing the some of the groups of the encoding target block using the second quantization parameter, and encoding each of the some of the groups using the encoding schemes decided for each of the some of the groups, and the second total is a total of code lengths of encoded data generated by quantizing others of the groups using the first quantization parameter, and encoding each of the others of the groups using the encoding schemes decided for each of the others of the groups.

5. An apparatus according to claim 3, wherein the deciding unit is further configured to assign the second quantization parameter as the quantization parameter of at least a head group out of the plurality of groups of the encoding target block.

6. An apparatus according to claim 5, wherein the deciding unit is further configured to assign the second quantization parameter for a plurality of consecutive groups including the head group out of the plurality of groups of the encoding target block.

7. An apparatus according to claim 6, wherein the deciding unit is further configured to assign the first quantization parameter for groups other than the plurality of consecutive groups including the head group out of the plurality of groups of the encoding target block.

8. An apparatus according to claim 1, wherein the deciding unit is further configured to, when selecting the second mode, decide the quantization parameter for each pixel included in the encoding target block.

9. An apparatus according to claim 1, wherein the second quantization parameter is a quantization parameter corresponding to a quantization step that is next largest after the first quantization parameter out of the plurality of quantization parameters.

10. An apparatus according to claim 1, wherein in the plurality of quantization parameters, a quantization result becomes 1 bit smaller if the quantization parameter increases by 1.

11. An apparatus according to claim 1, wherein the image data includes pixels of a plurality of colors and the groups include pixels of different colors.

12. An image processing apparatus comprising:
    an acquiring unit configured to acquire an encoding target block having a plurality of groups each including a predetermined number of pixels;
    a deciding unit configured to decide, for each group, a quantization parameter used to quantize image data of the group and an encoding scheme so that a code length of the encoding target block does not exceed a predetermined value corresponding to a target code amount of the encoding target block, wherein the deciding unit selects, as the encoding scheme of respective groups, either of a first encoding scheme that outputs quantized image data or a second encoding scheme that outputs encoded data of a differential between quantized image data and prediction data;
    an encoding unit configured to generate encoded data by encoding image data of the encoding target block in accordance with the quantization parameters and the encoding schemes decided for the respective groups by the deciding unit; and
    a multiplexing unit configured to generate stream data by multiplexing encoded data of the encoding target block outputted from the encoding unit and header information including first information for identifying the encoding mode that the deciding unit selected,
    wherein the deciding unit is further configured to assign, as the quantization parameter of the respective groups, either a first quantization parameter or a second quantization parameter corresponding to a quantization step smaller than a quantization step corresponding to the first quantization parameter, out of the plurality of quantization parameters,
    wherein the deciding unit selects as an encoding mode for the encoding target block either a first mode that selects either the first encoding scheme or the second encoding scheme as the encoding scheme for each group, by comparing sums of code lengths for each group resulting from encoding using each encoding scheme, or a second mode that selects the first encoding scheme as the encoding scheme of all groups of the encoding target block, and decides the quantization parameters and the encoding schemes of the plurality of groups of the encoding target block in accordance with the selected encoding mode,
    wherein the multiplexing unit is further configured to multiplex the header information which includes second information for identifying the encoding scheme of each of the plurality of groups of the encoding target block if the deciding unit selects the first mode, and multiplexes the header information which does not include the second information if the deciding unit selects the second mode,
    wherein, if the second mode is selected by the deciding unit, the encoding unit is further configured to assign, within the target code amount of the block, a size excluding the size of the header information is assigned to encoded data, and
    wherein the encoding unit is further configured to multiplex to the encoded data the header information including a code word based on a combination of the encoding mode of the encoding target block, and information of the first quantization parameter or the second quantization parameter.

13. An image processing method comprising:
    acquiring an encoding target block having a plurality of groups each including a predetermined number of pixels;
    deciding for each group a quantization parameter used to quantize image data of the group and an encoding scheme so that a code length of the encoding target block does not exceed a predetermined value corresponding a target code amount of the encoding target block,
    wherein the deciding selects, as the encoding scheme of respective groups, either of a first encoding scheme that outputs quantized image data or a second encoding scheme that outputs encoded data of a differential between quantized image data and prediction data; and
    generating encoded data by encoding image data of the encoding target block in accordance with the quantization parameters and the encoding schemes decided for the respective groups by the deciding, wherein the deciding assigns, as the quantization parameter of the respective groups, either a first quantization parameter or a second quantization parameter corresponding to a quantization step smaller than a quantization step corresponding to the first quantization parameter, out of the plurality of quantization parameters, and wherein the deciding selects as an encoding mode of the encoding target block either a first mode that selects either the first encoding scheme or the second encoding scheme as the encoding scheme for each group, by comparing sums of code lengths for each group resulting from encoding using each encoding scheme, or a second mode that selects the first encoding scheme as the encoding scheme of all groups of the encoding target block, and decides the quantization parameters and the encoding schemes of the plurality of groups of the encoding target block in accordance with the selected encoding mode, wherein the deciding selects whichever of the first mode and the second mode has a smaller total of quantization parameters assigned to the plurality of groups of the encoding target block and selects the second mode regardless of the total of the quantization parameters, if the code length of the encoding target block obtained in the first mode is not the predetermined value or less.

* * * * *